United States Patent [19]
Ohata et al.

[11] Patent Number: 5,864,857
[45] Date of Patent: Jan. 26, 1999

[54] METHOD FOR PROCESSING MULTI-DIMENSIONAL DATA

[75] Inventors: Hideo Ohata, Fujisawa; Kiyotaka Kiyasu, Kawasaki; Ikuyo Ozu, Kamakura; Tomoko Kimura, Kawasaki; Tetsuya Masuishi, Machida; Shigeru Yoneda, Ebina, all of Japan

[73] Assignee: Hitachi, Ltd., Tokyo, Japan

[21] Appl. No.: 835,026

[22] Filed: Mar. 27, 1997

[30] Foreign Application Priority Data

Mar. 29, 1996 [JP] Japan ................................. 8-075864

[51] Int. Cl.⁶ .................................................. G06F 17/30
[52] U.S. Cl. ............................................................ 707/100
[58] Field of Search ................................ 707/1, 100, 503, 707/504, 509

[56] References Cited

U.S. PATENT DOCUMENTS

| | | | |
|---|---|---|---|
| 5,359,724 | 10/1994 | Earle . | |
| 5,572,644 | 11/1996 | Liaw et al. | 395/793 |
| 5,592,666 | 1/1997 | Perez | 395/600 |
| 5,657,437 | 8/1997 | Bishop et al. | 395/764 |
| 5,729,730 | 3/1998 | Wlaschin et al. | 395/603 |
| 5,745,902 | 4/1998 | Miller et al. | 707/200 |

OTHER PUBLICATIONS

Al–furaih et al. "Parallel Construction of Multidimensional Binary Search Trees" ACM Digital Library, pp. 205–212, Jul. 1996.

Lehner et al. "Cross–DB: A Feature–Extended Multidimensional Data Model for Statistical and Scientific Databases" ACM Digital Library, pp. 253–260, Aug. 1996.

Gray et al. "Data Cube: A Relational Aggregation Operator Generalizing Group–By, Cross–Tab and Sub–Totals" IEEE, pp. 152–159, Feb. 1996.

Polo et al. "Multi–Dimensional Partitioning for Massively Parallel Database Machines" IEEE, pp. 244–251, Feb. 1995.

Zhou et al. "Disk Allocation Methods for Parallelizing Grid Files" IEEE, pp. 243–252, Feb. 1994.

Drach et al. "Optimizing Mass Storage Organization and Access for Multi–Dimensional Scientific Data" IEEE, pp. 215–219, Mar. 1993.

LeBlanc et al. "Exploring N–Dimensional Databases" IEEE, 1990, pp. 230–237, Feb. 1990.

ACM Transactions on Database Systems, vol. 9, No. 1, Mar. 1984, "The Grid File: An Adaptable, Symmetric Multikey File Structure", J. Nievergelt et al, pp. 38–71.

IEEE Transactions on Data and Knowledge Engineering, 2(1), Mar. 1990, "The Gamma Database Machine Project", DeWitt et al, pp. 609–626.

*Primary Examiner*—Thomas G. Black
*Assistant Examiner*—Michael J. Wallace, Jr.
*Attorney, Agent, or Firm*—Fay, Sharpe, Beall, Fagan, Minnich & McKee

[57] ABSTRACT

In a multi-dimensional data management method in a database management system, a collection of members constituting each dimension is grouped and page indexes constituted by entries corresponding to combinations of member groups of each dimension are assigned to a memory unit. A set of member groups corresponding to input data is determined from a set of members of dimensions specifying the input data and an entry of page index corresponding to the set of member groups is obtained. When a page number is not registered in said obtained entry, a page is assigned in the memory unit and the page number of the page is registered in the entry. The input data and identification information of the data are paired to be stored in the page having the page number registered in the entry.

10 Claims, 18 Drawing Sheets

FIG.4 cube ⟨DATABASE NAME⟩ ~401 variable ⟨VARIABLE NAME⟩ ⟨DATA TYPE NAME⟩ ~402 dimension ⟨DIMENSION NAME⟩ ⟨BASIC DINEMSION MEMBER NAME⟩ ··· ~403 summary ⟨DIMENSION NAME⟩ ⟨HIGHER-RANK DIMENSION MEMBER NAME⟩ ~404
⟨SUMMARY FUNCTION NAME⟩ ⟨LOWER RANK DIMENSION MEMBER NAME⟩ ···

FIG.5 cube ANALYSIS OF SALES ~501 variable AMOUNT OF SALES int  
variable NUMBER OF GOODS SOLD int  } ~502 dimension GOODS DM1 DS1 NS1 ND1 SM1 SS1 SB1 3050 3500 ~503 summary GOODS DESKTOP PC sum DM1 DS1 ~504 summary GOODS NOTE PC sum NS1 ND1 ~505 summary GOODS PC SERVER sum SM1 SS1 SB1 ~506 summary GOODS PC sum DESKTOP PC NOTE PC PC SERVER ~507 summary GOODS WS sum 3050 3500 summary GOODS ALL GOODS sum PC WS dimension MARKET TOKYO CHIBA KANAGAWA OSAKA HYOGO KYOTO summary MARKET KANTO sum TOKYO CHIBA KANAGAWA summary MARKET KANSAI sum OSAKA HYOGO KYOTO ~508 summary GOODS ALL GOODS sum KANTO KANSAI dimension PERIOD '94/04 '94/05 '94/06 '94/07 '94/08 '94/09 '94/10 '94/11 Ac '96/03 summary PERIOD FIRST HALF OF '94 FISCAL YEAR sum '94/04 '94/05 '94/06 '94/07 '94/08 '94/09 summary PERIOD SECOND HALF OF '94 FISCAL YEAR sum '94/10 '94/11 '94/12 '95/01 '95/02 '95/03 summary PERIOD '94 FISCAL YEAR sum FIRST HALF OF '94 FISCAL YEAR SECOND HALF OF '94 FISCAL YEAR summary PERIOD FIRST HALF OF '95 FISCAL YEAR sum '95/04 '95/05 '95/06 '95/07 '95/08 '95/09 summary PERIOD SECOND HALF OF '95 FISCAL YEAR sum '95/10 '95/11 '95/12 '96/01 '96/02 '96/03 summary PERIOD '95 FISCAL YEAR sum FIRST HALF OF '95 FISCAL YEAR SECOND HALF OF '95 FISCAL YEAR summary PERIOD ALL PERIOD sum '94 FISCAL YEAR '95 FISCAL YEAR

FIG.7

GOODS, MARKET, PERIOD, AMOUNT OF SALES, NUMBER OF GOODS SOLD ~701

SB1, KANAGAWA, '94/09, 9643, 12 ~702

SM1, OSAKA, '94/04, 24038, 23 ~703

3050, KYOTO, '94/07, 6192, 3 ~704

DM1, TOKYO, '94/12, 37317, 122 ~705

NS1, CHIBA, '94/06, 14271, 32 ~706

FIG.13

NODE INDEX
1301

NODE NUMBER
1302

| | |
|---|---|
| 0 | 0 |
| 1 | 1 |
| 2 | 2 |
| 3 | 0 |
| 4 | 1 |
| 5 | 1 |
| 6 | 2 |
| 7 | 0 |
| 8 | 1 |
| 9 | 2 |
| ⋮ | ⋮ |

METHOD FOR PROCESSING MULTI-DIMENSIONAL DATA

BACKGROUND OF THE INVENTION

The present invention relates to a database management system and more particularly to a multi-dimensional data storing and retrieving method suitable for storing a great deal of multi-dimensional data in a memory unit with a smaller capacity required and retrieving the multi-dimensional data at a higher speed.

The multi-dimensional retrieval function for retrieving data specified by any combination of members of dimensions is one of the most fundamental functions in the multi-dimensional database management system for supporting a many-faceted analysis of data. In order to process this function at a high speed, the following technique has been used heretofore.

The system of storing data in a hard disk unit in a format suitable for retrieval of multi-dimensional data involves a system in which data are linearly arranged in order of a nest of dimension coordinates in accordance with the memory array method of array data of a computer language and stored, a system in which the multi-dimensional data space is assumed to be divided in the direct product of sub-spaces in which data having effective values are distributed in sparsely and sub-spaces in which data having effective values are distributed densely and a memory area is allotted to only sub-space of the latter sub-spaces which is not empty to be pointed by the pointer array corresponding to the former sub-space (U.S. Pat. No. 05359724), and a grid file system in which attributes of record data of a relational model are considered as dimensions and the data space constituted by the dimensions is divided into rectangular parallelepipedic blocks so that pages for storing records belonging to the same block are allotted and indexes for recording the correspondence of coordinates of the blocks and the pages are prepared (Nievergelt, J., et al., "The Grid File: An Adaptable, Symmetric Multikey File Structure", ACM Transactions on Database Systems, vol. 9, No. 1, pp. 38–71, 1984).

The data retrieval can be made at a high speed by means of the parallel processing. In order that the parallel processing is effective, it is necessary to uniform loads imposed on a plurality of processing units. In order to uniform the loads of the data retrieval, it is important how data are allotted to the plurality of processing units and are stored. The relational database management system uses the round-robin partitioning, the hash partitioning and the range partitioning methods (DeWitt, D., et al., "The Gamma Database Machine Project", IEEE Transactions on Knowledge and Data Engineering, Vol. 2, No. 1, pp. 44–63, 1990).

SUMMARY OF THE INVENTION

It is an object of the present invention to provide a storing and retrieving method of multi-dimensional data for attaining the retrieval function of multi-dimensional data of a multi-dimensional database management system at a high speed.

In order to attain the high-speed retrieval of the multi-dimensional data, there can be considered the high-speed decision of a memory location of data to be retrieved, the high-speed apparent reading of data from a hard disk unit and the high-speed operation by application of the parallel processing. The high-speed reading of data is influenced by the reading efficiency of data per page and the page buffering efficiency and is further influenced by the clustering effect indicating how many pertinent data are clustered to be stored in the same page and the sparse data compression effect indicating how effective data distributed sparsely in the multi-dimensional data space are stored in the pages with reduced uselessness.

Of the prior art described above, the data storage system in which the multi-dimensional data are linearly arranged has an advantage that the page addressing for determining the page in which data are stored can be processed by calculation of coordinates, whereas the system has a problem that there is no compression effect of sparse data and a physical distance of allocation between adjacent data in the data space is greatly offset depending on the dimensional direction, that is, the clustering is offset. Further, the data storage system of U.S. Pat. No. 05359724 has an advantage that the simplicity of the addressing and the compression storing of sparse data are compatible, whereas the system has a problem that there is no effect of compression when classification of dimensions into sparse and dense dimensions is not clear and identification as to whether dimensions are sparse or dense is generally difficult. The grid file system has advantages such as the simplicity of the addressing, the compression storing of sparse data and no inclination of dimensions in the clustering, whereas the system has a problem that since whole records containing dimension information is a unit of storage, the data storing efficiency of pages is deteriorated.

On the other hand, the data partitioning and storing system for parallel processing such as the round-robin partitioning, the hash partitioning and the range partitioning is to perform the simple cyclic allocation or the allocation using a single key value and does not utilize the characteristics of the multi-dimensional data usefully.

It is an object of the present invention to provide a storing and retrieving method of multi-dimensional data which attains the retrieval function of multi-dimensional data which is a fundamental function of the multi-dimensional database management system at a high speed by solving the drawbacks in the prior art as described above.

In order to achieve the above object, multi-dimensional data are stored by a method comprising a first step of assigning a series of numerical coordinates to members constituting each dimension and dividing the coordinates by sections to group the members and assign a series of numerical coordinates to member groups obtained by the grouping, a second step of allotting to a memory unit, memory areas for page indexes constituted by entries corresponding to combinations relative to the plurality of dimensions, of the member groups determined in the first step and in which the entries are arranged in order of a nest with respect to a set of numerical coordinates of the corresponding member group, a third step of inputting data to be stored in the memory unit, a fourth step of determining block coordinates which are a set of numerical coordinates of a member group corresponding to the data inputted by the third step, from a set of members of dimensions specifying the data, a fifth step of calculating a distance from the head of the page indexes on the basis of the block coordinates determined in the fourth step to thereby determine a memory location of the page index entry corresponding to the block coordinates and obtain the entry, a sixth step of assigning a memory area of a page to the memory unit to register a page number of the page in the entry when the page number is not registered in the page index entry obtained in the fifth step, and a seventh step of pairing the data inputted in the third step and identification information of the data to store the paired data and identification information in the page having the page number registered in the page index entry obtained in the fifth step and further the multi-dimensional data are retrieved by a method comprising an eighth step of inputting a retrieval condition represented by a combination of members of dimensions, a ninth step of determining block coordinates corresponding to the retrieval condition inputted in the eighth step from combinations of members of dimensions specifying retrieval data, a tenth step of making calculation of a distance from the head of the page index on the basis of the block coordinates determined in the ninth step to thereby determine a memory location of the page index entry corresponding to the block coordinates and obtain the entry, and an eleventh step of obtaining from the memory unit the page having the page number registered in the page index entry obtained in the tenth step and obtaining data having identification information corresponding to the retrieval data from the page.

Further, in a parallel processing configuration using a plurality of processing nodes each including a CPU and a memory unit and interconnected through a communication network, multi-dimensional data are stored by a method comprising a first step of assigning a series of numerical coordinates to members constituting each dimension and dividing the coordinates by sections to thereby group the members and assign a series of numerical coordinates to the obtained member groups, a second step of allotting to the memory units of the plurality of processing nodes, memory areas for page indexes constituted by entries corresponding to combinations relative to the plurality of dimensions, of the member groups determined in the first step and in which the entries are arranged in order of a nest with respect to a set of numerical coordinates of the corresponding member group, a third step of inputting data to be stored in the memory units of the plurality of processing nodes, a fourth step of determining block coordinates which are a set of numerical coordinates of a member group corresponding to the data inputted in the third step, from combinations of members of dimensions specifying the data, a fifth step of determining a processing node for storing the data inputted by the third step on the basis of the block coordinates determined by the fourth step so that data positioned in adjacent different diagonal planes of block coordinate space are assigned to different processing nodes, a sixth step of, in regard to the processing unit determined in the fifth step, calculating a distance from the head of the page indexes of the processing node determined in the fifth step on the basis of the block coordinates determined in the fourth step to thereby determine a memory location of a page index entry corresponding to the block coordinates and obtain the entry, a seventh step of, in regard to the processing unit determined in the fifth step, assigning a memory area of a page to the memory unit of the processing node determined in the fifth step and registering a page number of the page in the page index entry obtained in the sixth step when the page number is not registered in the page index entry, and an eighth step of, in regard to the processing unit determined in the fifth step, pairing the data inputted in the third step 3 and identification information of the data to store the paired data and identification information in the page having the page number registered in the page index entry obtained in the sixth step, and further the multi-dimensional data is retrieved by a method comprising a ninth step of inputting a retrieval condition represented by a combination of members of dimensions, a tenth step of deciding block coordinates corresponding to the retrieval condition inputted in the ninth step 9 from combinations of members of dimensions specifying retrieval data, an eleventh step of determining a processing node for storing the retrieval data having the block coordinates determined in the tenth step in accordance with an assignment method to the processing node of the memory data determined in the fifth step, a twelfth step of, in regard to the processing node determined in the eleventh step 11, making calculation of a distance from the head of the page index on the basis of the block coordinates determined in the tenth step to thereby determine a memory location of the page index entry corresponding to the block coordinates and obtain the entry, and a thirteenth step of, in regard to the processing node determined by the eleventh step, obtaining from the memory unit of the processing unit the page having the page number registered in the page index entry obtained in the twelfth step and obtaining data having identification information corresponding to the retrieval data from the page.

According to the system, since the multi-dimensional data space is divided into blocks and data are stored in a page in a unit of block, there is no inclination of dimensions in clustering and since the entries in the page index are arranged on the basis of the block coordinates, addressing is easy. Further, since data except dimension information and identification information constituted by coded dimension information are paired to be stored in the page, the data storing efficiency in the page is improved by compression of dimension information and compression of sparse data.

Further, according to the system, in the parallel processing configuration, data of blocks in adjacent diagonal planes in multi-dimensional data space are assigned to different processing nodes. In the multi-dimension retrieval, since data of parallel or vertical section are retrieved at the same time in dimensional axes, load on data retrieval is always uniform.

According to the present invention, the database management system for multi-dimensional data is effective in storing data in the memory unit with smaller capacity required and retrieving data at a higher speed.

BRIEF DESCRIPTION OF THE DRAWINGS

FIG. 4 shows an example of a data model definition format of multi-dimensional data;

FIG. 5 shows a data model definition example of multi-dimensional data;

FIG. 7 shows a file format of multi-dimensional data before stored;

FIG. 13 shows a structure a node index of the second embodiment of the present invention;

DESCRIPTION OF THE PREFERRED EMBODIMENTS

A first embodiment of the present invention is now described in detail with reference to FIGS. 1 to 11.

Figure 2:
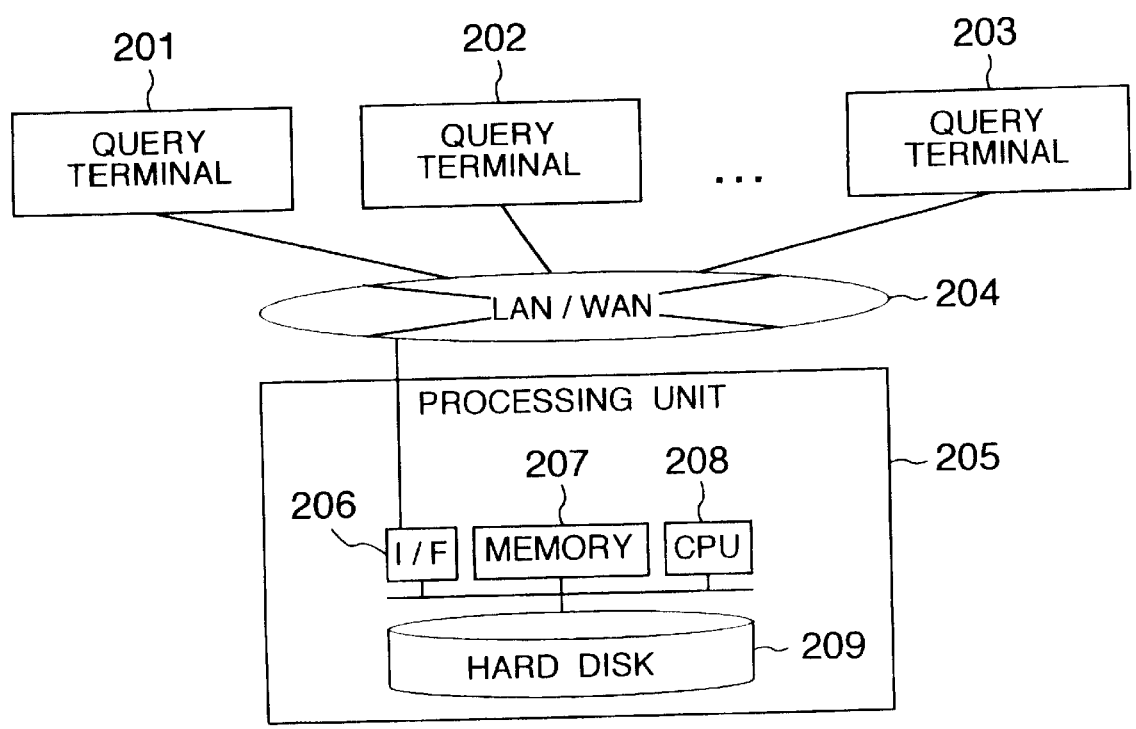
FIG. 2 schematically illustrates a hardware configuration of the first embodiment of the present invention.

FIG. 2 schematically illustrates a hardware configuration of the first embodiment of the present invention. Numerals 201 to 203 denote query terminals for inputting a definition of a data model of multi-dimensional data and a request of storing and retrieving multi-dimensional data and displaying a result of a retrieval request processed by the multi-dimensional database management system. 205 a processing unit for processing preparation, storing and retrieval of definition information of multi-dimensional data in response to a request from a user. 204 a LAN or WAN for performing communication of data between the query terminals 201 to 203 and the processing unit 205. 209 a hard disk in which multi-dimensional data, definition information thereof and programs for defining, storing and retrieval multi-dimensional data are stored. 207 and 208 a memory and a CPU, respectively, for executing the programs for definition, storing and retrieval of multi-dimensional data. 206 a network interface for performing communication by way of the LAN or WAN.

Figure 3:
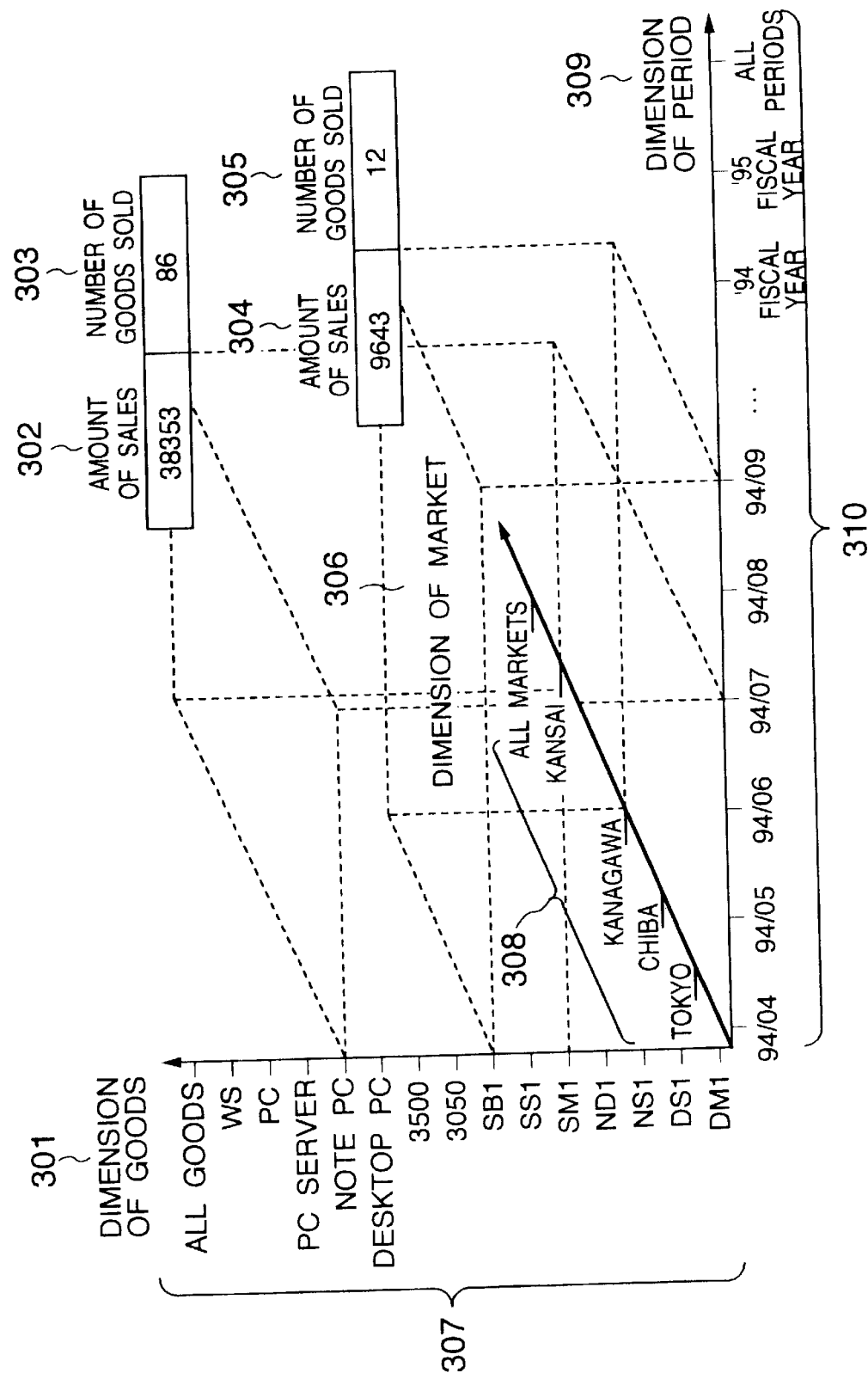
FIG. 3 shows an example of multi-dimensional data.

FIG. 3 shows an example of multi-dimensional data. This example shows an analysis of the sales of goods in a certain firm. In a multi-dimensional data model, index data to be analyzed are named variables. In the example, "the amount of sales" (302, 304) and "the number of goods sold" (303, 305) are variables. Dimensions are used to classify values taken by the variables and are constituted by a collection of dimension members representative of kinds of classification. In the example, there are three dimensions of "goods" 301, "market" 306 and "period" 309. The dimension of "goods" 301 includes dimension members of "DM1" to "all goods" (307). The dimension of "market" 306 includes members of "Tokyo" to "all markets" (308). The dimension of "period" 309 includes dimension members of "94/04" to "all periods" (310). A value "9643" of the variable "the amount of sales" and a value "12" of the variable "the number of goods sold" are specified by a combination of the dimension member "SB1" for the dimension of "goods", the dimension member "Kanagawa" for the dimension of "market" and the dimension member "94/09" for the dimension of "period". Further, a value "38353 of the variable "the amount of sales" and a value "86" of the variable "the number of goods sold" are specified by the dimension member "note PC" for the dimension of "goods", the dimension member "Kansai" for the dimension of "market" and the dimension member "94/07" for the dimension of "period".

FIG. 4 shows an example of a data model definition format of multi-dimensional data. A data model of multi-dimensional data is defined by designating a name for identifying the model, names of variables and data type belonging to the model, names of dimensions belonging to the model, names of dimension members constituting the dimensions, and a hierarchical relation among the dimension members for determining a summary method of multi-dimensional data. Numeral 401 denotes a sentence for defining a database name for identifying the model. 402 a sentence for defining variables belonging to the model and in which names of variables and data type are specified. 403 a sentence for defining dimensions belonging to the model and in which a row of names of dimensions and names of basic dimension members, of dimension members constituting the dimensions, positioned in the lowest rank of the hierarchical relation concerning the summary are designated. The basic dimension members correspond to members having values of corresponding variables which are not summarized at all. 404 a sentence for defining the hierarchical relation of dimension members concerning the summary and in which a row of names of dimensions to which dimension members are belong, names of dimension members positioned in the higher rank of the hierarchy, names of functions used in summary calculation, and names of dimension members positioned just below the higher rank dimension member are designated. A value of a variable corresponding to the higher rank dimension member is obtained by summarily calculating a value of a variable corresponding to the lower rank dimension member by means of a summary function.

FIG. 5 shows an example of a data model definition of multi-dimensional data prepared on the basis of the example of FIG. 3. A data base name of the model is "an analysis of sales" (501). Variables of "the analysis of sales" include "the amount of sales" and "the number of goods sold", both of which are of an integer type (502). Basic dimension members constituting the dimension "goods" of "the analysis of sales" include "DM1" to "3500" (503). The dimension member "desktop PC" of the dimension "goods" is a summary obtained by adding "DM1" and "DS1" (504). Similarly, "note PC" is a summary of "NS1" and "ND1" (505), "PC server" is a summary of "SM1", "SS1" and "SB1" (506), and "PC" is a summary of "desktop PC", "note PC" and "PC server" (507). In FIG. 3, the value "38353" of "the amount of sales" corresponding to a combination of the dimension "goods" of "the note PC", the dimension "market" of "Kansai" and the dimension "period" of "94/07" corresponds to a sum of "the amounts of sales" corresponding to the following six combinations since the basic dimension members for the lower rank of "the note PC" are "NS1" and "ND1" (505) and the basic dimension members for the lower rank of "Kansai" are "Osaka", "Hyogo" and "Kyoto" (508).

The dimension "goods" is "NS1", the dimension "market" is "Osaka" and the dimension "period" is "94/07".

The dimension "goods" is "NS1", the dimension "market" is "Hyogo" and the dimension "period" is "94/07".

The dimension "goods" is "NS1", the dimension "market" is "Kyoto" and the dimension "period" is "94/07".

The dimension "goods" is "ND1", the dimension "market" is "Osaka" and the dimension "period" is "94/07".

The dimension "goods" is "ND1", the dimension "market" is "Hyogo" and the dimension "period" is "94/07".

The dimension "goods" is "ND1", the dimension "market" is "Kyoto" and the dimension "period" is "94/07".

Figure 6:
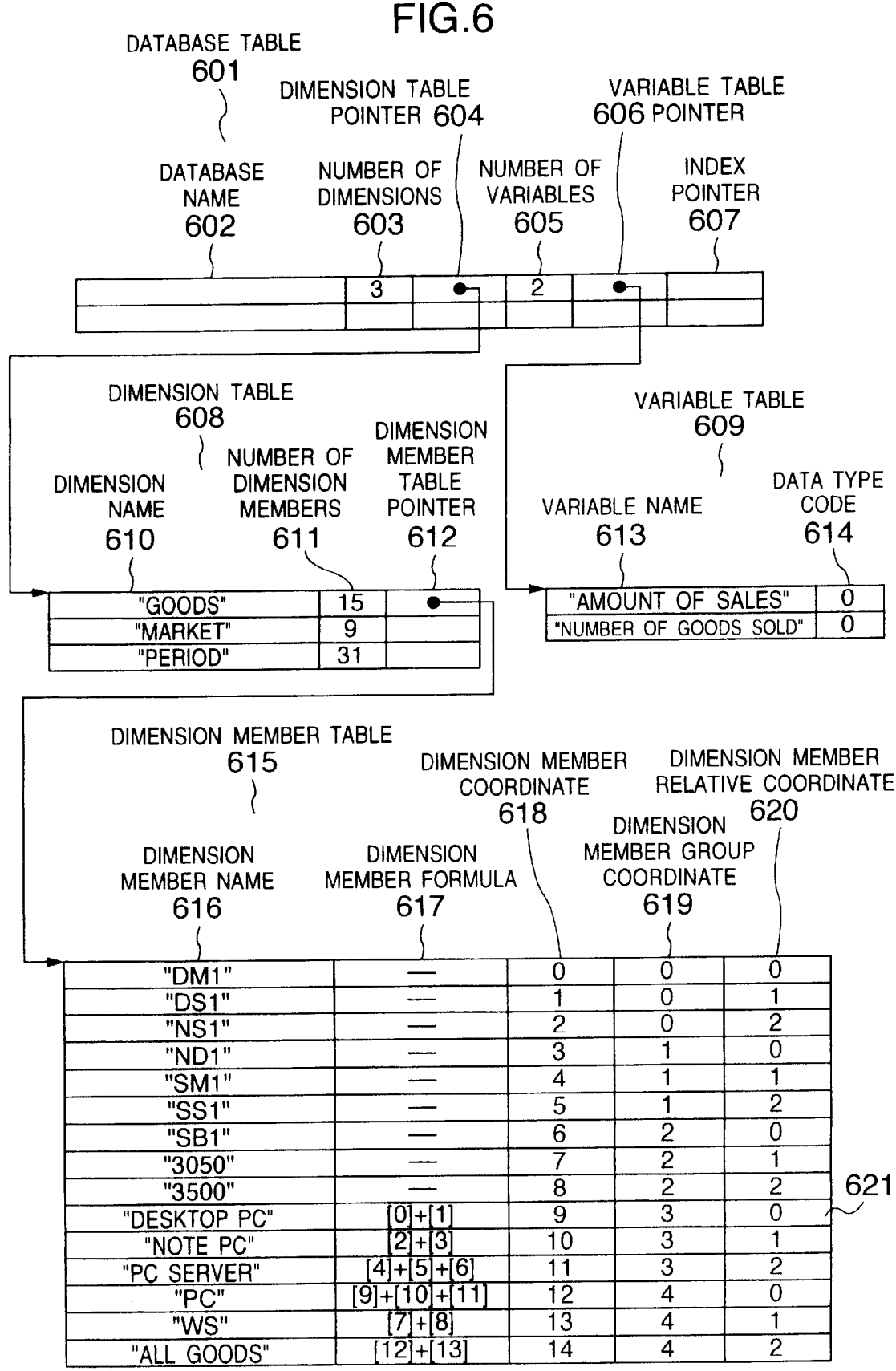
FIG. 6 shows a table structure of multi-dimensional data management information.

FIG. 6 shows a structure of a table for multi-dimensional data management information. The multi-dimensional data management table includes a database table 601, a dimension table 608, a variable table 609 and a dimension member table 615. Contents of a part of the table 601, the table 608, the table 609 and a part of the table 615 are prepared in the hard disk 209 when the user inputs the data model definition as shown in FIG. 5 from any of the query terminals 201 to 203. Remaining contents of the tables 601 and 615 are additionally prepared when the user inputs a storing request of multi-dimensional data as will be described with reference to FIG. 1.

The database table 601 includes a database name field 602, a dimension number field 603, a dimension table pointer field 604, a variable number field 605, a variable table pointer field 606 and an index pointer field 607. Entries registered in the table each correspond to a model of multi-dimensional data. Contents of the database name field 602, the dimension number field 603, the dimension table pointer field 604, the variable number field 605 and the variable table pointer field 606 are prepared upon definition of the data model and contents of the index pointer field 607 are prepared upon storing of multi-dimensional data. Database names designated by definition sentences 401 for pertinent models are stored in the database name field 602. The number of definition sentences 403 defined for the model, that is, the number of dimensions belonging to the model is stored in the dimension number field 603. A pointer to the dimension table 608 in which definition information concerning dimensions of the model is stored is stored in the dimension table pointer field 604. The number of definition sentences 402 defined for the model, that is, the number of variables belonging to the model is stored in the variable number field 605. A pointer to the variable table 609 in which definition information concerning variables of the model is stored is stored in the variable table pointer field 606. A pointer to a page index 801 which holds information concerning a page position on the hard disk in which variable values of the model are stored is stored in the index pointer field 607.

The dimension table 608 includes a dimension name field 610, a dimension number field 611 and a dimension member table pointer field 612. Entries of the table each correspond to one dimension of a specific model. A dimension name designated by the definition sentence 403 for the pertinent dimension is stored in the dimension name field 610. A sum of the number of the basis dimension member names designated by the definition sentence 403 for the pertinent dimension and the number of the definition sentence 404 defined for the dimension, that is, the number of all the dimension members constituting the dimension is stored in the dimension member number field 611. A pointer to the dimension member table 615 in which definition information concerning the dimension members is stored is stored in the dimension member table pointer field 612.

The variable table 609 includes a variable name field 613 and a data type code field 614. Entries of the table each correspond to one variable of a specific model. A variable name designated by the definition sentence 402 for the pertinent variable is stored in the variable name field 613. A code representative of a data type of a variable designated by the definition sentence 402 is stored in the data type code field 614.

The dimension member table 615 includes a dimension member name field 616, a dimension member formula field 617, a dimension member coordinate field 618, a dimension member group coordinate field 619 and a dimension member relative coordinate field 620. Entries of the table each correspond to one dimension member which is a constituent element of a specific dimension of a specific model. Contents of the dimension member name field 616, the dimension member formula field 617 and the dimension member coordinate field 618 are prepared upon definition of a data model and contents of the dimension member group coordinate field 619 and the dimension member relative coordinate field 620 are prepared upon storing of multi-dimensional data. Dimension member names designated by the definition sentence 403 or 404 for the pertinent dimension members are stored in the dimension member name field 616. Numerical coordinate values assigned to the dimension member are stored in the dimension member coordinate field 618. The numerical coordinate values of the dimension member are determined by assigning integer values to the dimension members constituting the same dimension in the ascending order starting from 0. A formula expressing a calculation method when the pertinent dimension member is obtained by summarizing other dimension members is stored in the dimension member formula field 617. For example, the relation of summary that "a sum of "DM1" and "DS1" is the "desktop PC"" as defined by the definition sentence 504 is stored in the dimension member formula field 617 of the entry 621 corresponding to "the desktop PC" in the expression of "[0]+[1]". The dimension members of "DM1" and "DS1" are expressed by the dimension member coordinates of [0] and [1], respectively. Group coordinate values and relative coordinate values assigned to the dimension members are stored in the dimension member group coordinate field 619 and the dimension member relative coordinate field 620, respectively. The group coordinate values of the dimension members are determined by grouping the dimension members constituting the same dimension and assigning integer values to the obtained groups in the ascending order starting from 0. The relative coordinate values of the dimension members are determined by assigning integer values to the dimension members classified into the same group by the grouping in the ascending order starting from 0.

FIG. 7 shows an example of a file format of data prepared before the user requires to store multi-dimensional data. In the first row of the file, the dimension names and the variable names partitioned by the partition mark "," are arranged (701). In the second and subsequent rows, names of the basic dimension members and values of the variables partitioned by the partition mark "," are arranged in the order corresponding to the arrangement of the first row (702 to 706). In the second row, values of "the amount of sales" and "the number of goods sold" corresponding to a combination of the dimension "goods" of "SB1", the dimension "market" of "Kanagawa" and the dimension "period" of "94/09" shown in FIG. 3 are given.

Figure 8:
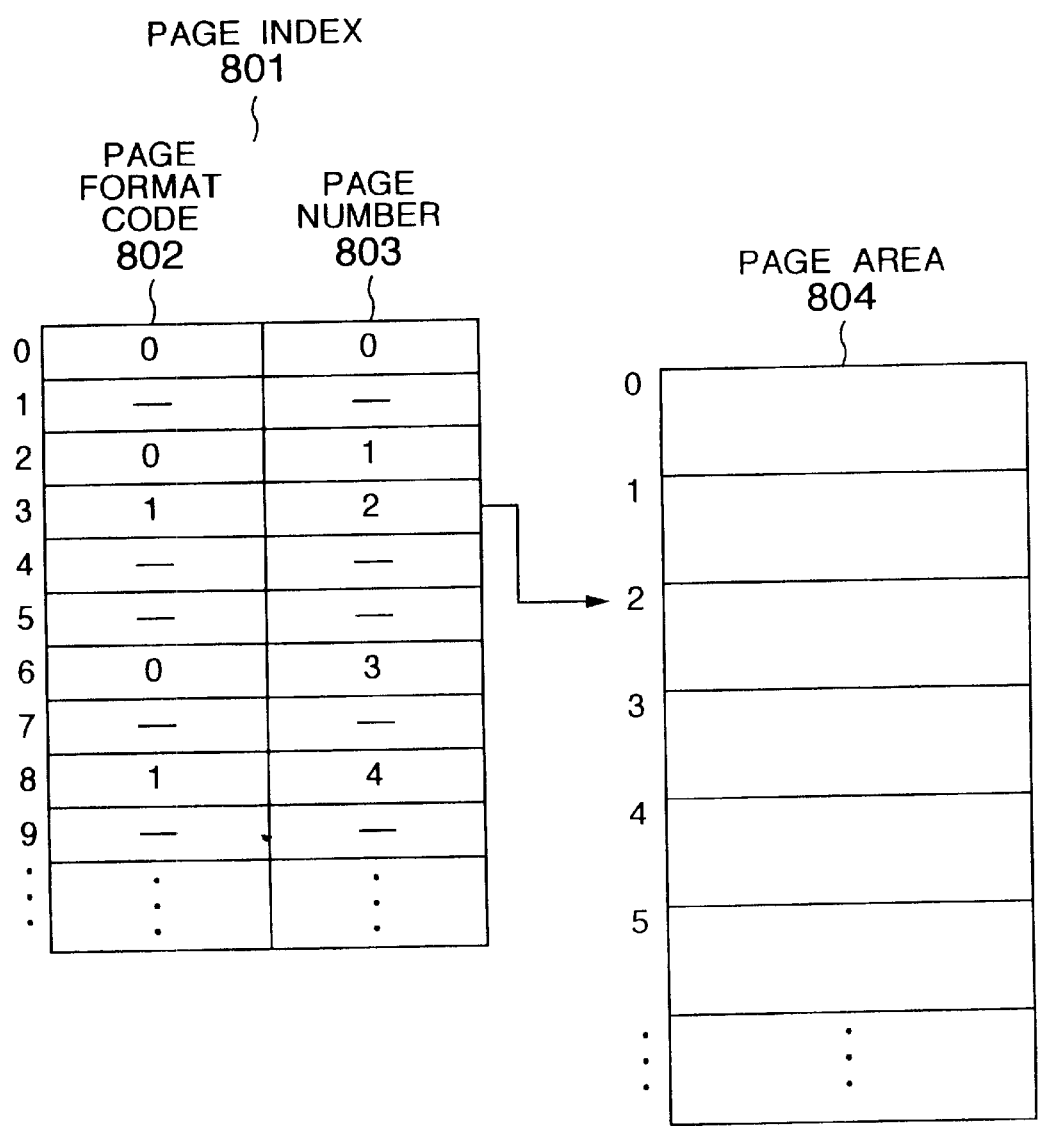
FIG. 8 shows a structure of a page index.

FIG. 8 shows a structure of the page index. Contents of the page index 801 are prepared in the hard disk 209 when the user inputs the storing request of multi-dimensional data from any of the query terminals 201 to 203. The page index 801 includes a page format code field 802 and a page number field 803. Variable values of a multi-dimensional data model are stored in a page area 804 in the hard disk 209 in a unit of page. The page index 801 is used to determine the page for storing the pertinent variable values at a high speed when any combination of dimension members is designated and the preparing method of contents thereof is described with reference to FIG. 1. A page number of the page corresponding to the pertinent index entry is stored in the page number field 803. Codes representative of the data format in the page are stored in the page format code field 802. The data formats in the page include the compressed allocation format and the linear allocation format described in FIGS. 9 and 10, respectively.

Figure 9:
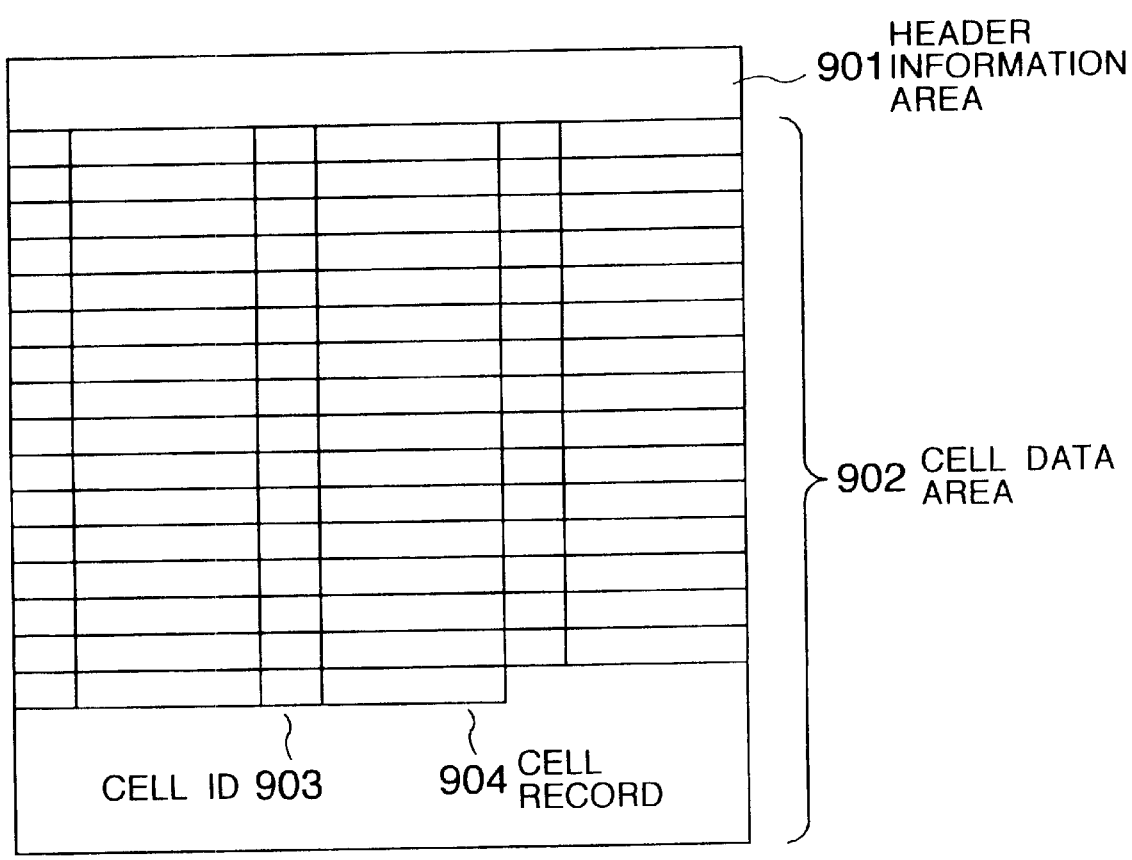
FIG. 9 shows a structure of a page in the compressed allocation format.

FIG. 9 shows a structure of the page using the compressed allocation format. A cell data area 902 is an area for storing variable values of the multi-dimensional data model and includes paired cell ID areas 903 and cell record areas 904 arranged in column. The cell record area 904 is an area for storing variable values of the model combined in a set. For example, the value "9643" of "the amount of sales" (304) and the value "12" of "the number of goods sold" (305) are combined into a set in order of registration into the variable table 609 to be stored. Stored in the cell ID area 903 is information for uniquely identifying to which dimension member the variable value stored in the cell record area 904 paired therewith corresponds. An actual method of preparing this identification information is described with reference to FIG. 1. The header information area 901 is an area in which the number of cell records stored in the cell data area 902, the page number of an overflown page and other page management information are stored. The variable value corresponding to the same entry of the page index 801 is stored in the page indicated by the page number field 803 of the same entry in accordance with the procedure described with reference to FIG. 1, while when an accommodation amount of page is exceeded, unused pages are successively obtained from the page area 804 and are used. The number of page assigned in occurrence of overflow is stored in the header information area 901 of the page on the side that the overflow occurs.

Figure 10:
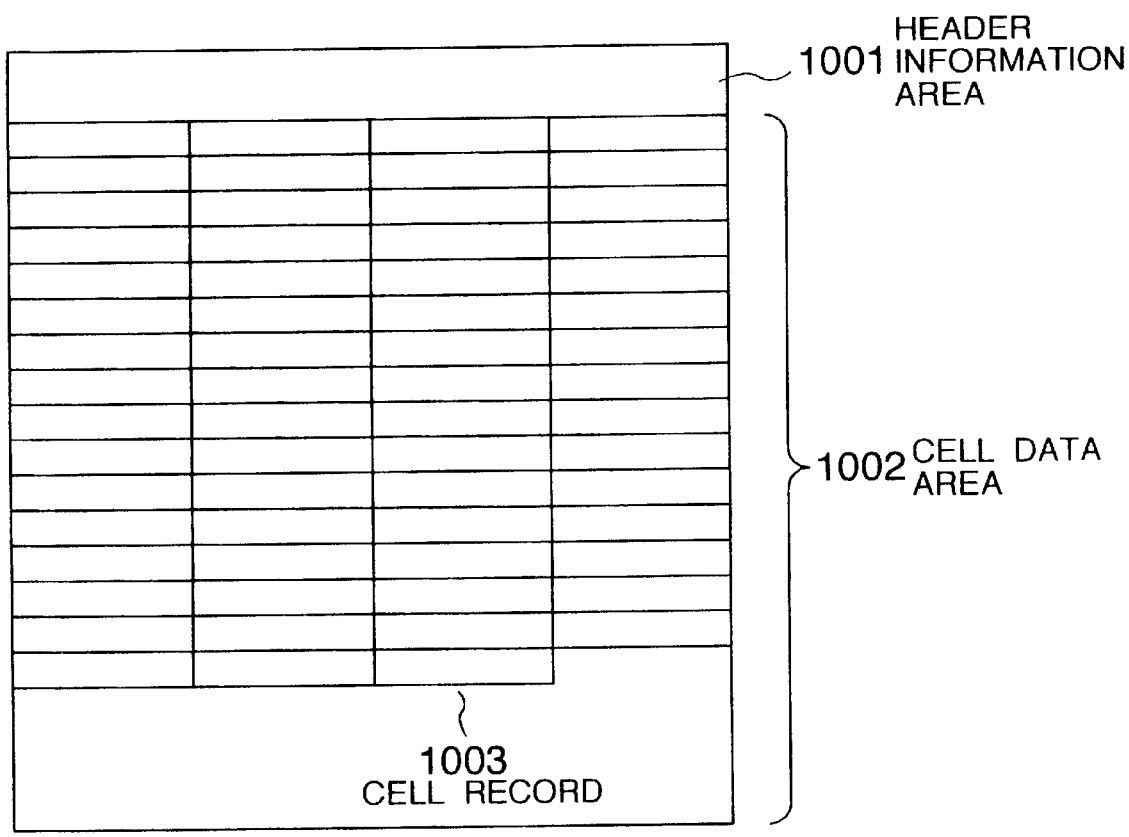
FIG. 10 shows a structure of a page in the linear allocation format.

FIG. 10 shows a structure of the page using the linear allocation format. Contents of a header information area 1001 are identical with the header information area 901 in the case of the compressed allocation format of FIG. 9. A cell data area 1002 is also an area for storing the variable value of the multi-dimensional data model similarly and includes cell record areas 1003 arranged in column and in which variable values of the model combined in a set are stored. The page structure using the linear allocation format is different from the compressed allocation format in that there is no cell ID area 903 and the position of the cell record area 1003 in the page uniquely expresses combined dimension members corresponding to the variable values stored in the same area. The method of determining the position in the page of the cell record area 1003 satisfying such conditions is described with reference to FIG. 1.

Figure 1:
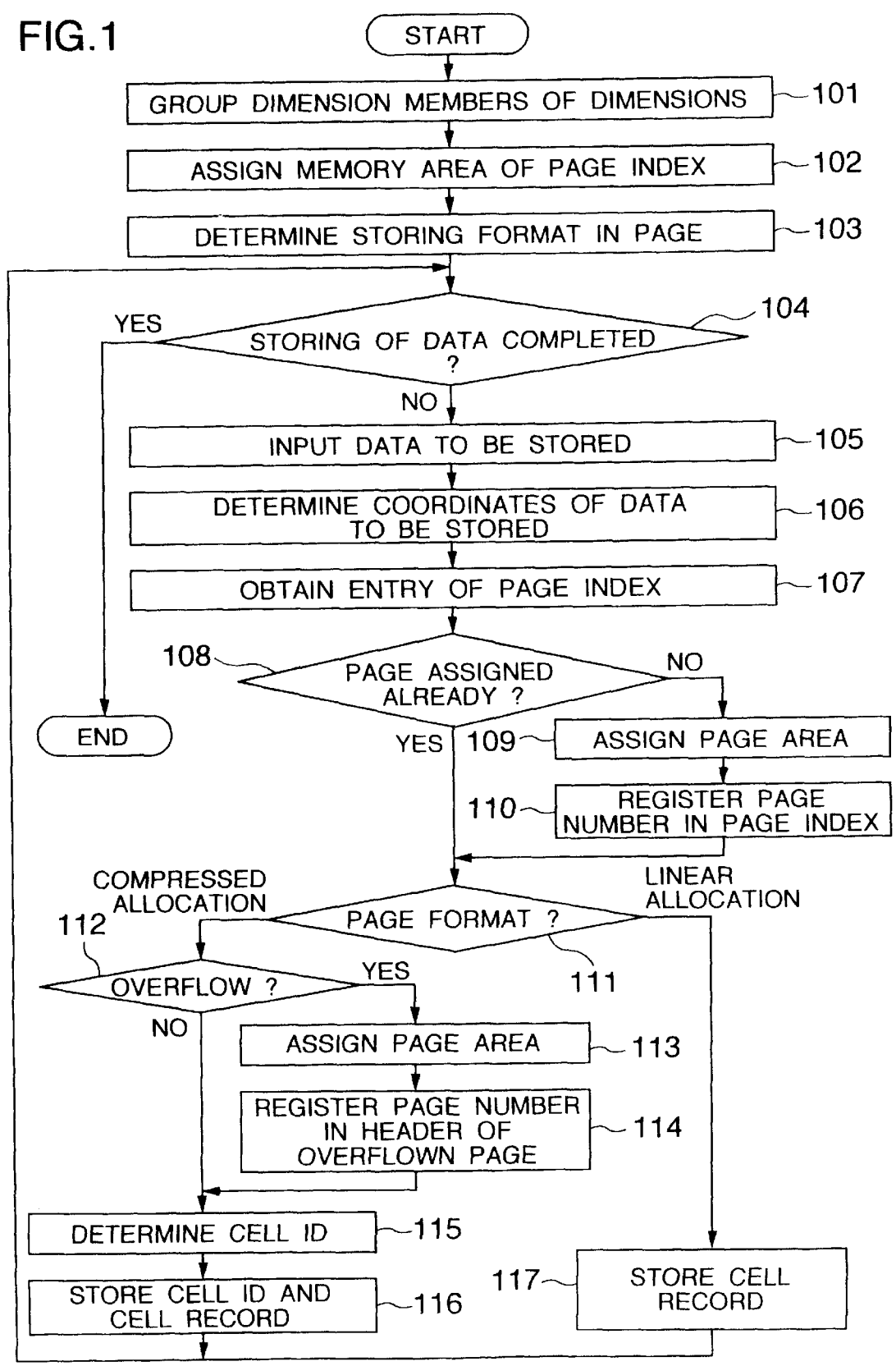
FIG. 1 is a flow chart showing the storing procedure of multi-dimensional data according to a first embodiment of the present invention.

FIG. 1 is a flow chart showing the storing procedure of multi-dimensional data in the first embodiment of the present invention. The procedure is executed by the processing unit 205 when a data storing request of the multi-dimensional data model is inputted by the user by means of any of the query terminals 201 to 203.

First, in step 101, dimension members of dimensions of the multi-dimensional data model designated are grouped and group coordinate values and relative coordinate values for the dimension member table 615 are stored in the dimension member group coordinate field 619 and the dimension member relative coordinate field 620 on the basis of the resultant grouping, respectively. Then, the process proceeds to step 102. In general, the group coordinate values of the dimension members are integer values assigned to the groups to which the members belong in the ascending order starting from 0 and the relative coordinate values are integer values assigned to the members belonging to the same group in the ascending order starting from 0.

The more definite method of determining the group coordinate values and the relative coordinate values of the dimension members is now described. When the number of dimensions of the multi-dimensional data model is N and the numbers of members of the respective dimensions thereof are M(1), M(2), . . . , M(N), the coordinate values i(1), i(2), . . . , i(N) of the dimension members of the respective dimensions have integer values in the range defined by the following equation:

$$0 \leq i(p) \leq M(p)-1 (p=1, 2, \ldots, N)$$

The variable values of the multi-dimensional data model are uniquely identified by combined dimension members, hence the sets of the coordinate values of the dimension members. The sets (i(1), i(2), . . . , i(N)) of the coordinate values of the dimension members are named cell coordinates. For example, the value "9643" of "the amount of sales" (304) and the value "12" of "the number of goods sold" (305) correspond to a combination of the dimension "goods" of "SB1", the dimension "market" of "Kanagawa" and the dimension "period" of "94/09", while when the coordinates of the dimension members "SB1", "Kanagawa" and "94/09" are 6, 2 and 5, respectively, the cell coordinates of the values "9643" and "12" of "the amount of sales" and "the number of goods sold", respectively, are (6, 2, 5). M(p) dimension members of each dimension are collected by a predetermined number K(p) in order of coordinates into groups and the group coordinate value I(p) and the relative coordinate value Δi(p) of the dimension members are defined by the following equation:

$$I(p)=\text{FLOOR}[i(p)/K(p)](p=1, 2, \ldots, N)$$

$$\Delta i(p)=\text{MOD}[i(p),K(p)](p=1, 2, \ldots, N)$$

where FLOOR[x] is a maximum integer which does not exceed an real number x and MOD[m,n] represents a remainder obtained by dividing a nonnegative integer m by a positive integer n. I(p) means a value obtained by discarding a remainder from a quotient obtained by dividing i(p) by K(p). A set (I(1), I(2), . . . , I(N)) of group coordinate values and a set (Δi(1), Δi(2), . . . , Δi(N)) of relative coordinate values of the dimension members are named block coordinates and relative cell coordinates, respectively. In the example of FIG. 3, when K(1)=K(2)=K(3)=3, the block coordinates and the relative cell coordinates of the values "9643" and "12" of "the amount of sales" and "the number of goods sold" having the cell coordinates of (6, 2, 5) are (2, 0, 1) and (0, 2, 2), respectively.

In step 102, an area for storing the page index 801 is assigned in the hard disk 209 and an address of the page index 801 is stored in the index pointer field 607 of the database table 601. Then, the process proceeds to step 103. The total number of entries of the page index 801 is G(1)×G(2)×. . . ×G(N), where G(p) is the number of groups when the members of each dimension is grouped and is given by the following equation when the definite grouping method shown in step 101 is used.

$$G(p)=\text{FLOOR}[(M(p)-1)/K(p)]+1 \; (p=1, 2, \ldots, N)$$

In step 103, the storing format of the corresponding page for each entry of the page index 801 is determined from any of the compressed allocation format of FIG. 9 and the linear allocation format of FIG. 10 and a code indicative of the storing format is stored in the page format code field 802 of the page index. Then, the process proceeds to step 104. Selection of the compressed allocation format or the linear allocation format is made on the basis of the storing efficiency of data. When the number of cell data assigned to the page is small, the data storing efficiency for the compressed allocation format is higher, whereas when the number of cell data is large, the data storing efficiency for the linear allocation format is higher. When data are stored in accordance with this procedure, the variable value having the same block coordinates is stored in the page corresponding to the same entry of the page index. More particularly, the variable value having the block coordinates of (I(1), (2), . . . , I(N)) is stored in the page corresponding to the k'th entry of the page index. k is given by the following equation:

$$k = I(1) + I(2) \times G(1) + I(3) \times G(1) \times G(2) + \ldots + I(N) \times G(1) \times G(2) \times \ldots \times G(N-1)$$

Data of FIG. 7 before stored or partially sampled data thereof are previously analyzed to calculate the data distribution density for each entry, so that the format having the good storing efficiency of data is selected.

In step 104, it is judged whether data of the file to be read in the form of FIG. 7 are all read and stored or not. When all data are not read and stored, the process proceeds to step 105 and when all data have been read and stored, the procedure is completed.

In step 105, data are read by one line from the file to be read and the process proceeds to step 106.

In step 106, the dimension table and the dimension member table are retrieved for the basic dimension members arranged at the first half of the read line so that pertinent dimension member coordinates, dimension member group coordinates and dimension member relative coordinates are determined and the process proceeds to step 107.

In step 107, the entry of the page index 801 corresponding to the read data is determined and the process proceeds to step 108. When the block coordinates of the read data are (I(1), I(2), . . . , I(N)), the entry position k of the corresponding page index is given by the following equation:

$$k = I(1) + I(2) \times G(1) + I(3) \times G(1) \times G(2) + \ldots + I(N) \times G(1) \times G(2) \times \ldots \times G(N-1)$$

In step 108, the page number field 803 of the page index entry determined in step 107 is examined to judge whether the page corresponding to the entry is already assigned or not. When assigned, the process proceeds to step 111 and when not assigned, the process proceeds to step 109.

In step 109, an unused page is obtained from the page area 804 in the hard disk 209 and the process proceeds to step 110.

In step 110, the page number of the page assigned in step 109 is registered in the page number field 803 of the page index entry examined in step 108 and the process proceeds to step 111.

In step 111, the page format code field 802 of the page index entry determined in step 107 is examined. When the code stored therein is the code indicative of the compressed allocation format, the process proceeds to step 112 and when it is the code indicative of the linear allocation format, the process proceeds to step 117.

In step 112, it is judged whether there is any blank in the page corresponding to the page number obtained in step 108 or the last page reached by tracing a chain of an overflow page when the page has the overflow page or not. When there is no blank, the process proceeds to step 113 and when there is a blank, the process proceeds to step 115.

In step 113, an unused page is obtained from the page area 804 in the hard disk 209 and the process proceeds to step 114.

In step 114, the page number of the page assigned in step 113 is registered in the header information area 901 of the overflow page in the last end of the chain obtained in step 112 and the process proceeds to step 115.

In step 115, the cell ID corresponding to the data read in step 105 is determined and process proceeds to step 116. The cell ID is information required to uniquely identify which combination of the dimension members the data corresponds to. Definite determination methods include a method using the absolute coordinates and a method using the relative coordinates of the cell. In the method using the absolute coordinates of the cell, the cell ID is given by the following equation:

$$\text{Cell ID} = i(1) + i(2) \times M(1) + i(3) \times M(1) \times M(2) + \ldots + i(N) \times M(1) \times M(2) \times \ldots \times M(N-1)$$

where cell coordinates of data are (i(1), i(2), . . . , i(N)) and M(1), M(2), . . . , M(N) are the numbers of members of dimensions. On the other hand, in the method using the relative coordinates of the cell, the cell ID is given by the following equation:

$$\text{Cell ID} = \Delta i(1) + \Delta i(2) \times K(1) + \Delta i(3) \times K(1) \times K(2) + \ldots + \Delta i(N) \times K(1) \times K(2) \times \ldots \times K(N-1)$$

where the relative cell coordinates of the data are ($\Delta i(1)$, $\Delta i(2)$, . . . , $\Delta i(N)$) and K(1), K(2), . . . , K(N) are the number of members collected when the members of each dimension are grouped. In the method using the relative coordinates, in order to uniquely identify the combination of dimension members corresponding to the data, the block ID given by the following equation is required other than the cell ID.

$$\text{Block ID} = I(1) + I(2) \times G(1) + I(3) \times G(1) \times G(2) + \ldots + I(N) \times G(1) \times G(2) \times \ldots \times G(N-1)$$

where the block coordinates of data are (I(1), I(2), . . . , I(N)) and G(1), G(2), . . . , G(N) are the numbers of groups when the members of each dimension are grouped. Since the value of the block ID is coincident with the value k of the page index entry position obtained already in step 107, it is not necessary to calculate it again. The method using the relative coordinates has the advantage that the method can store larger coordinate values and cope with large-scale multi-dimensional data when the data length of the cell ID is identical, as compared with the method using the absolute coordinates.

In step 116, the cell ID determined in step 115 and the variable value arranged in the second half of the row read in step 105 are stored in the unused cell ID area 903 and cell record area 904 in the page having a blank and obtained in step 108 or the page assigned newly in step 109 or 113, respectively, and the process is returned to step 104 so that the procedure subsequent to step 104 is repeated. When the cell ID and the variable value are stored, the data in the page or the data in the page including the overflown page may be rearranged in order of sorted values of the cell ID. By sorting the cell ID, data can be retrieved at a higher speed.

In step 117, a position in the page for storing the variable values arranged in the second half of the row read in step 105 is determined and the value is stored in the cell record area 1003 in the position. Then, the process is returned to step 104 so that the procedure subsequent to step 104 is repeated. The position k of the cell record area is given by the following equation:

$$k = \Delta i(1) + \Delta i(2) \times K(1) + \Delta i(3) \times K(1) \times K(2) + \ldots + \Delta i(N) \times K(1) \times K(2) \times \ldots \times K(N-1)$$

where the relative cell coordinates of the data are ($\Delta i(1)$, $\Delta i(2)$, . . . , $\Delta i(N)$) and K(1), K(2), . . . , K(N) are the number of members collected when the members of each dimension are grouped. When the position k determined by the above equation exceeds the size of the page, necessary pages are assigned to the page area 804 in the hard disk 209 to connect the chain of overflow.

Figure 11:
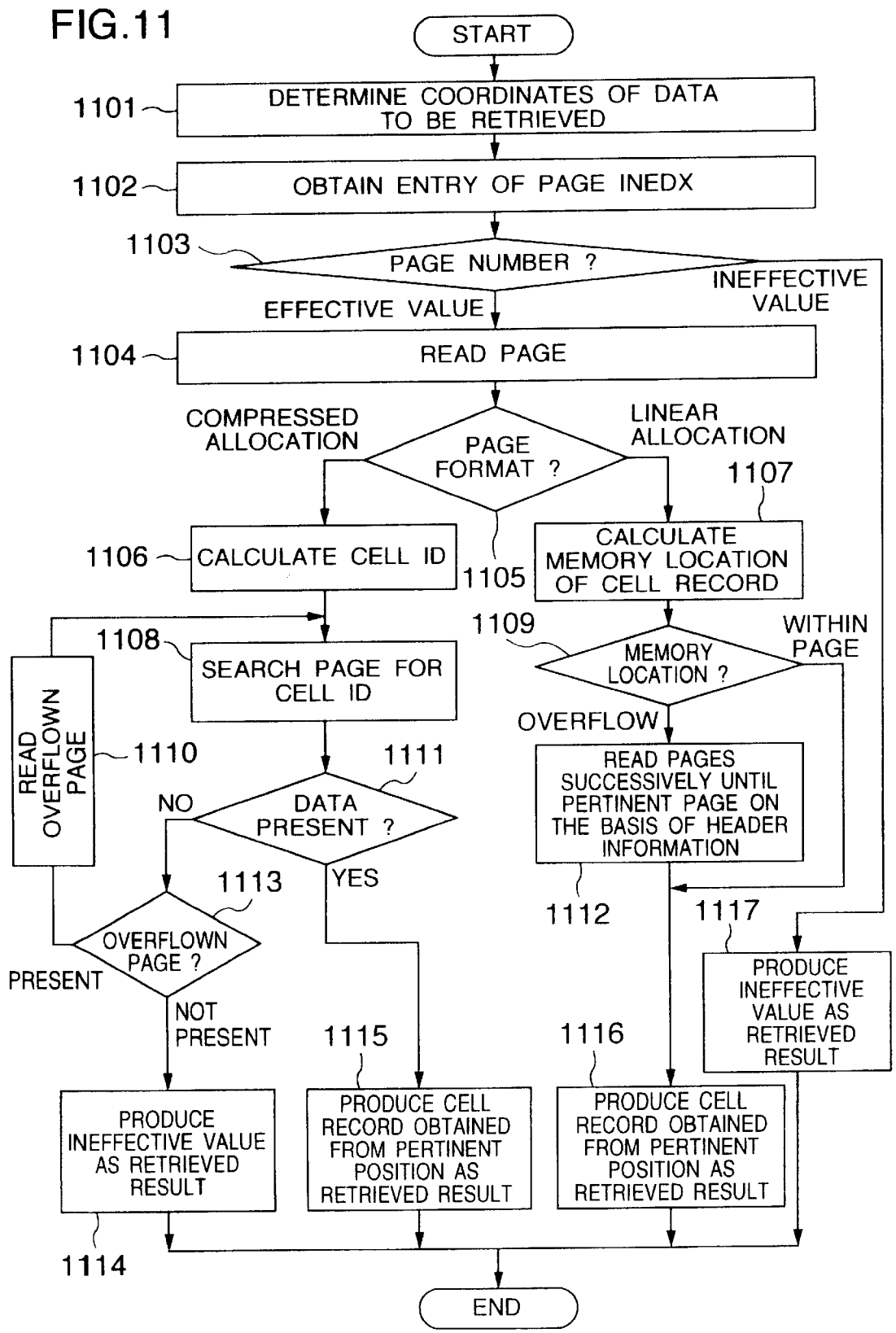
FIG. 11 is a flow chart showing a retrieval procedure of multi-dimensional data in the first embodiment of the present invention.

FIG. 11 is a flow chart showing the multi-dimensional data retrieval procedure in the first embodiment of the present invention. The procedure is executed by the processing unit 205 when the data retrieval request of the multi-dimensional data model is inputted by the user from any of the query terminals 201 to 203.

First, in step 1101, the dimension member of each dimension for specifying the data required to be retrieved is retrieved from the dimension table and the dimension member table to obtain pertinent dimension member coordinates, dimension member group coordinates and dimension member relative coordinates and the process proceeds to step 1102.

In step 1102, the entry position k of the page index 801 corresponding to the data to be retrieved is calculated by the following equation to obtain the page index entry in the position and the process proceeds to step 1103.

$$k=I(1)+I(2)\times G(1)+I(3)\times G(1)\times G(2)+ \ldots +I(N)\times G(1)\times G(2)\times \ldots \times G(N-1)$$

where the block coordinates of the data to be retrieved are (I(1), I(2), . . . , I(N)) and G(1), G(2), . . . , G(N) are the numbers of groups when the members of each dimension are grouped.

In step 1103, the value of the page number registered in the page number field 803 of the entry obtained in step 1102 is judged. When the value is an effective value, the process proceeds to step 1104 and when the value is an ineffective value, the process proceeds to step 1117.

In step 1104, the page having the page number obtained in step 1103 is read from the hard disk 209 into the memory 207 and the process proceeds to step 1105.

In step 1105, the page format code field 802 of the entry obtained by step 1102 is examined. When the code stored therein is the code indicative of the compressed allocation format, the process proceeds to step 1106 and when the code stored therein is the code indicative of the linear allocation format, the process proceeds to step 1107.

In step 1106, the cell ID of the data to be retrieved is calculated and the process proceeds to step 1108. The definite calculation method of the cell ID is the same as the method described in step 115 of the data storing procedure.

In step 1108, the page read into the memory 207 in step 1104 or 1110 is searched for the cell record having the same cell ID as the value calculated in step 1106 and the process proceeds to step 1111.

In step 1111, it is judged whether the pertinent cell record is present in the page or not. When it is not present, the process proceeds to step 1113 and when it is present, the process proceeds to step 1115.

In step 1113, it is judged whether the page number of the overflow page is registered in the header information area 901 of the page searched in step 1108 or not. When the overflow page is present, the process proceeds to step 1110 and when the overflow page is not present, the process proceeds to step 1114.

In step 1110, the overflown page having the page number obtained in step 1113 is read from the hard disk 209 into the memory 207 and the process proceeds to step 1108.

In step 1114, an ineffective value is produced as the value of the data to be retrieved and the procedure is finished. The ineffective value is a value such as "0", a deficient value or the like concretely and is prescribed in each data model.

In step 1115, the contents of the cell record detected in step 1111 are produced as the value of the data to be retrieved and the procedure is finished.

In step 1107, the memory location of the cell record holding the data to be retrieved is calculated and the process proceeds to step 1109. The definite calculation method of the memory location of the cell record is the same as the method described in step 1117 of the data storing procedure.

In step 1109, it is judged whether the memory location calculated in step 1107 is present within the page read into the memory 207 in step 1104 or not. When it is present, the process proceeds to step 1116 and when it is not present, the process proceeds to step 1112.

In step 1112, the overflown page number registered in the header information area 1001 of the read page is successively traced to thereby read the pages until the pertinent position is reached, and the process proceeds to step 1116.

In step 1116, the contents of the cell record in the memory location calculated in step 1107 are produced as the value of the data to be retrieved and the procedure is finished.

In step 1117, an ineffective value is produced as the value of the data to be retrieved and the procedure is finished.

A second embodiment of the present invention is now described in detail with reference to FIGS. 3 to 10 and 12 to 18.

Figure 12:
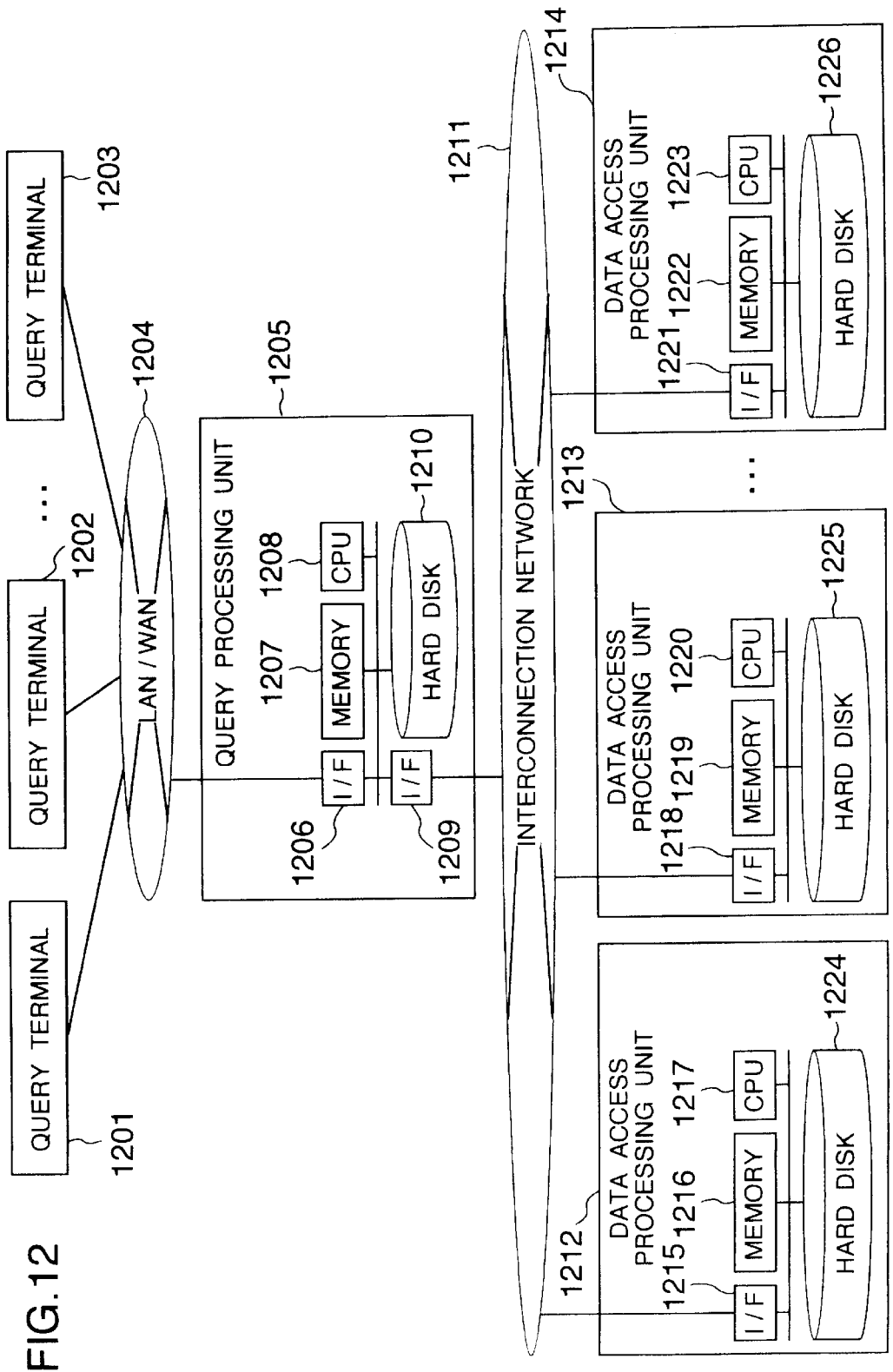
FIG. 12 schematically illustrates a hardware configuration of a second embodiment of the present invention.

FIG. 12 schematically illustrates a hardware configuration of the second embodiment of the present invention. In this hardware configuration, the contents processed by the processing unit 205 alone in the configuration of FIG. 2 in the first embodiment are processed in parallel by cooperation of a query processing unit 1205 and a plurality of data access processing units 1212 to 1214. Numerals 1201 to 1203 denote query terminals for inputting definition of a data model of multi-dimensional data and a storing and retrieval request of multi-dimensional data by the user and displaying a result of the retrieval request processed by the multi-dimensional database management system. Numeral 1205 denotes the query processing unit for processing preparation, storing and retrieval of definition information of multi-dimensional data by controlling the data access processing units 1212 to 1214 in response to a request from the user. Numeral 1204 denotes a LAN or WAN for performing communication of data between the query terminals 1201 to 1203 and the processing unit 1205. Numeral 1210 denotes a hard disk in which definition information of multi-dimensional data and programs for controlling definition, storing and retrieval of multi-dimensional data are stored. Numerals 1207 and 1208 denote a memory and a CPU for performing the programs for controlling definition, storing and retrieval of multi-dimensional data, respectively. Numerals 1206 and 1209 denote network interfaces for performing communication by way of LAN or WAN and an interconnection network, respectively. Numerals 1212 to 1214 denote data access processing units for performing partial processes relative to storing and retrieval of multi-dimensional data in accordance with control of the query processing unit 1205. Numeral 1211 denotes an interconnection network for performing communication of data between the query processing unit 1205 and the data access processing units 1212 to 1214. Numerals 1224 to 1226 denote hard disks in which multi-dimensional data and programs for partial process relative to storing and retrieval of multi-dimensional data. Numerals 1216, 1219 and 1222 and 1217, 1220 and 1223 denote memories and CPUs for performing programs for partial process relative to storing and retrieval of multi-dimensional data, respectively, and 1215, 1218 and 1221 denote network interfaces for performing communication by way of the interconnection network.

Description relating to FIG. 3 showing an example of multi-dimensional data, FIG. 4 showing an example of the data model definition format of multi-dimensional data, FIG. 5 showing an example of the data model definition of multi-dimensional data and FIG. 7 showing an example of the file format of multi-dimensional data before stored is the same as the first embodiment and accordingly is omitted.

Description relating to FIG. 6 showing the table structure of the multi-dimensional data management information is also the substantially same as the first embodiment. There are two differences therebetween that the database table 601, the dimension table 608, the variable table 609 and the dimension member table 615 are prepared in the hard disk 1210 of the query processing unit 1205 and the pointer to the node index 1301 is stored in the index pointer field 607 of the database table 601.

FIG. 13 shows a structure of a node index. Contents of the node index 1301 are prepared in the hard disk 1210 when the user inputs a storing request of multi-dimensional data from any of the query terminals 1201 to 1203 as described with reference to FIG. 14. The node index 1301 includes a node number field 1302. In the second embodiment, variable values of the multi-dimensional data model are distributed to be stored in the hard disks 1224 to 1226 of the data access processing units 1212 to 1214. The node index 1301 is used to determine the data access processing unit for storing a pertinent variable value when any combination of dimension members is designated, and the preparation method of the contents is described with reference to FIG. 14. The number assigned to the data access processing unit corresponding to the pertinent index entry is stored in the node number field 1302.

Description relating to FIG. 8 showing the structure of the page index is also the substantially same as the first embodiment. A difference is that the page index 801 and the page area 804 are prepared in the hard disks 1224 to 1226 of the data access processing units 1212 to 1214.

Description relating to FIG. 9 showing the page structure using the compressed allocation format and FIG. 10 showing the page structure using the linear allocation format is the same as the first embodiment.

Figure 14:
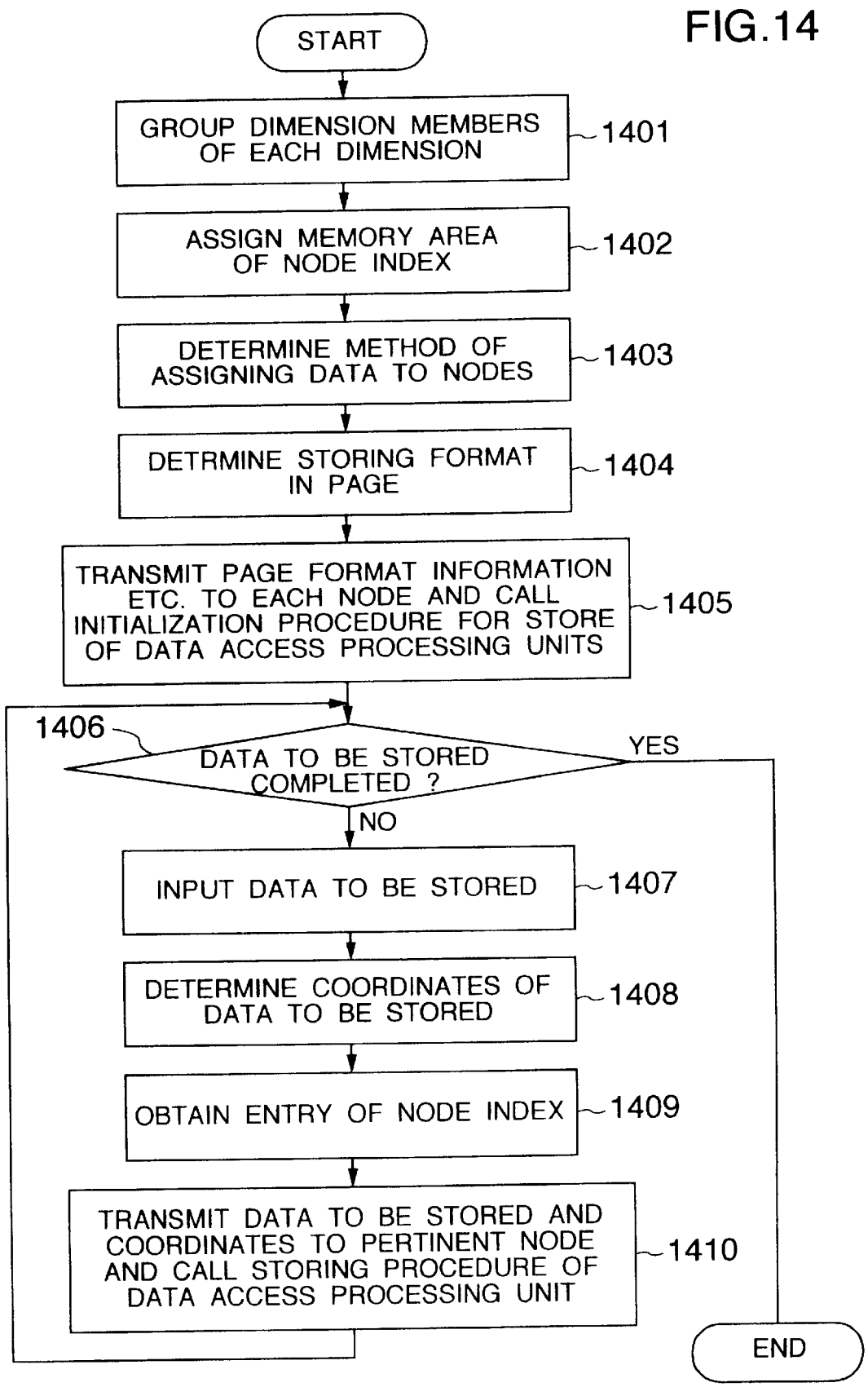
FIG. 14 is a flow chart showing a storing procedure of multi-dimensional data in a query processing unit of the second embodiment of the present invention.

FIG. 14 is a flow chart showing the multi-dimensional data storing procedure in the query processing unit of the second embodiment of the present invention. This procedure is executed in the query processing unit 1205 when a data storing request for the multi-dimensional data model is inputted from any of the query terminals 1201 to 1203 by the user.

First, in step 1401, the dimension members of each dimension of the designated multi-dimensional data model are grouped, and the group coordinate values and the relative coordinate values of the dimension members are stored in the dimension member group coordinate field 619 and the dimension member relative coordinate field 620 of the dimension member table 615 on the basis of the grouped result, respectively. Then, the process proceeds to step 1402. The determining method of the group coordinate values and the relative coordinate values of the dimension members is the same as in step 101 of FIG. 1.

In step 1402, the area for storing the node index 1301 is assigned to the hard disk 1210 and the address of the node index 1301 is stored in the index pointer field 607 of the database table 601. Then, the process proceeds to step 1403. The total number of entries of the node index 1301 is $G(1) \times G(2) \times \ldots \times G(N)$, where $G(p)$ is the number of groups when the members of each dimension are grouped.

In step 1403, the data access processing unit corresponding to each entry of the node index 1301 is determined and the node number of the pertinent unit is stored in the node number field 1302 of the entry. Then, the process proceeds to step 1404. The number of the data access processing unit in which multi-dimensional data are stored is recorded in the node index in relation to the coordinates. The data having the block coordinates of $(I(1), I(2), \ldots, I(N))$ corresponds to the entry in the position k determined by the following equation, of the node index entries.

$$k=I(1)+I(2) \times G(1)+I(3) \times G(1) \times G(2)+ \ldots +I(N) \times G(1) \times G(2) \times \ldots \times G(N-1)$$

where $G(p)$ is the number of groups when the members of each dimension is grouped. Assignment of data to the data access processing units 1212 to 1214 is determined so that data having the block coordinates arranged on the same diagonal plane of the coordinate space are assigned to the same unit. As an definite example, there is a method that data having the block coordinates of $(I(1), I(2), \ldots, I(N))$ is assigned to the data access processing unit having the node number q determined by the following equation:

$$q=\mathrm{MOD}[I(1)+I(2)+ \ldots +I(N), L]$$

where L is the number of the data access processing units and the node number q is assumed to take a value in the range of 0 to L−1.

In step 1404, the storing format of the page in which corresponding data is stored for each of the block coordinates $(I(1), I(2), \ldots, I(N))$ is determined from any of the compressed allocation format of FIG. 9 and the linear allocation format of FIG. 10 and the process proceeds to step 1405. The method of selecting the compressed allocation format or the linear allocation format is the same as in step 103 of FIG. 1. When data are stored in accordance with this procedure, the data having the same block coordinates are stored in the page corresponding to the same entry of the page index in the same data access processing unit.

In step 1405, the page format information determined in step 1404 and the parameter relative to the data model are transmitted to all of the data access processing units 1212 to 1214 and the initialization procedure (FIG. 15) in storing of multi-dimensional data in each unit is called. After the completion of the initialization procedure, the process proceeds to step 1406. The parameter to be transmitted of the data model includes the number $M(p)$ of members of each dimension, the number $K(p)$ of members combined when the members of each dimension are grouped and the number $G(p)$ of the groups.

In step 1406, it is judged whether all of data of the file to be read in the format of FIG. 7 are read to be stored or not. When all data are not completed, the process proceeds to step 1407 and when all data are completed, this procedure is finished.

In step 1407, data are read out by one row from the file to be read and the process proceeds to step 1408.

In step 1408, the dimension table and the dimension member table are searched for the basic dimension members arranged in the first half of the read row to determine pertinent dimension member coordinates, dimension member group coordinates and dimension member relative coordinates and the process proceeds to step 1409.

In step 1409, the entry of the node index 1301 corresponding to the read data is determined and the process proceeds to step 1410. When the block coordinates of the read data are $(I(1), I(2), \ldots, I(N))$, the position k of the pertinent index entry is given by the following equation:

$$k=I(1)+I(2) \times G(1)+I(3) \times G(1) \times G(2)+ \ldots +I(N) \times G(1) \times G(2) \times \ldots \times G(N-1)$$

G(p) is the number of groups of the members of each dimension.

In step 1410, the node number is obtained from the node number field 1302 of the node index entry determined in step 1409 and the read data and the coordinate value of the data determined in step 1408 are transmitted to the data access processing unit having the node number. The multi-dimensional data storing procedure (FIG. 16) in the unit is called and after the completion of the procedure, the process proceeds to step 1406 to repeat the procedure subsequent to step 1406.

Figure 15:
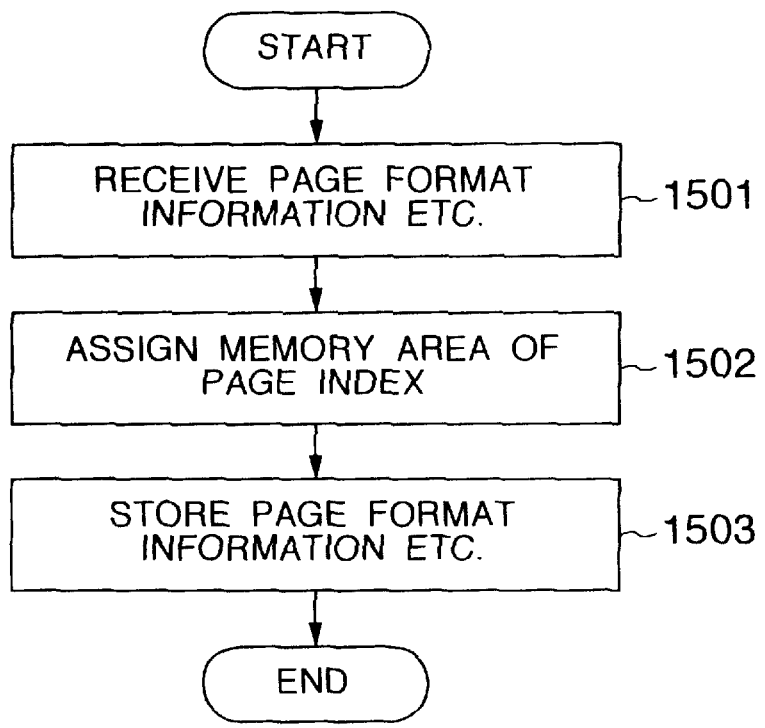
FIG. 15 is a flow chart showing an initialization procedure in storing of multi-dimensional data in a data access processing unit of the second embodiment of the present invention.

FIG. 15 is a flow chart showing the initialization procedure in storing of multi-dimensional data in the data access processing unit of the second embodiment of the present invention. This procedure is executed in a pertinent one of the data access processing units 1212 to 1214 when the procedure is called in step 1405 of FIG. 14.

First, in step 1501, the page format information and the parameter of the data model are received from the query processing unit 1205 and the process proceeds to step 1502.

In step 1502, the area for storing the page index 801 is assigned to the hard disk of the unit and the process proceeds to step 1503. When the number of groups of members of each dimension is G(p), the total number of entries of the page index 801 is G(1)×G(2)× . . . ×G(N).

In step 1503, the page format information and the parameter of the data model received in step 1501 are stored in the page format code field 802 of the page index 801 and the model parameter area in the hard disk, respectively, and this procedure is finished.

Figure 16:
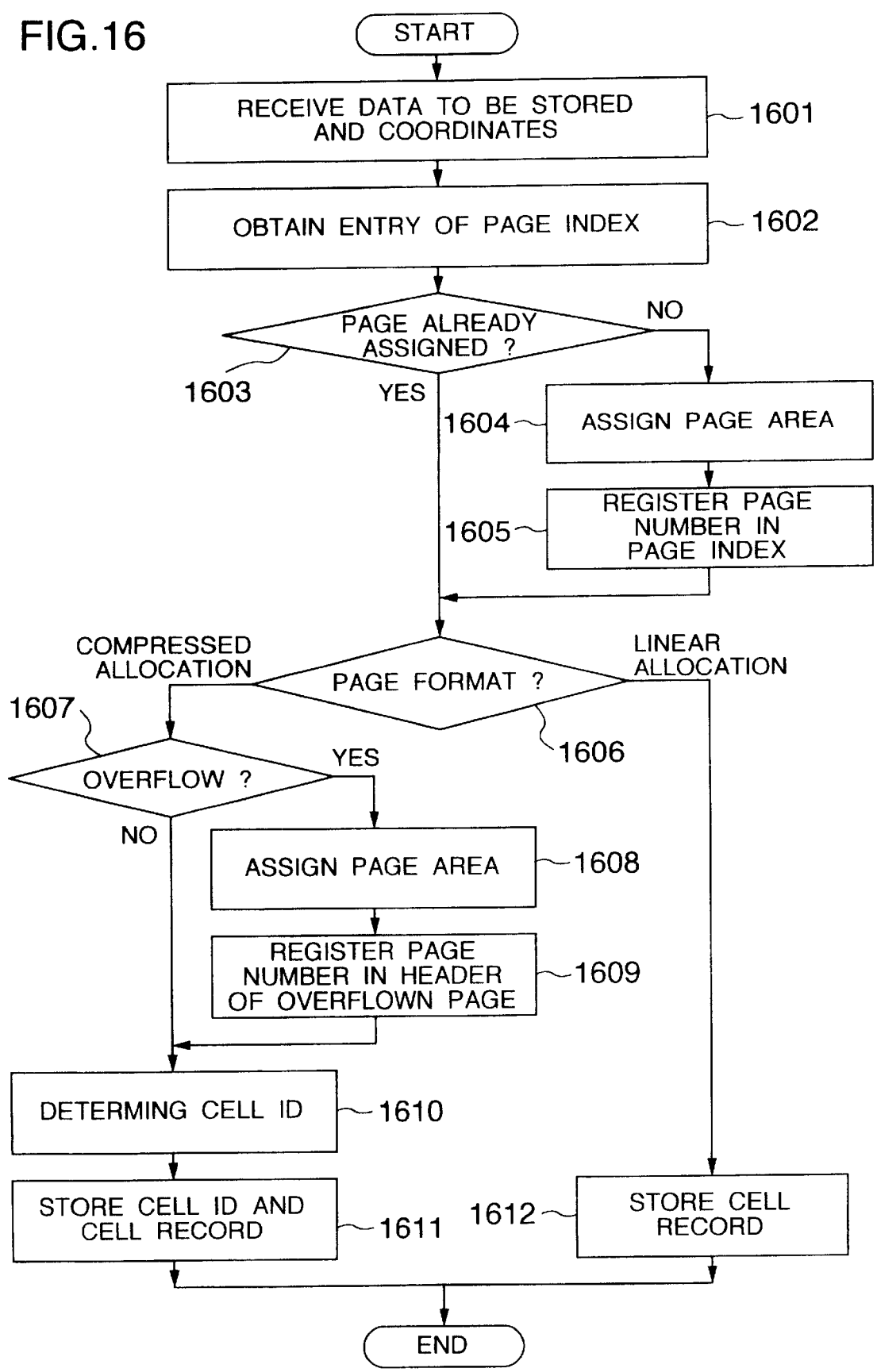
FIG. 16 is a flow chart showing a storing procedure of multi-dimensional data in the data access processing unit of the second embodiment of the present invention.

FIG. 16 is a flow chart showing the multi-dimensional data storing procedure in the data access processing unit of the second embodiment of the present invention. This procedure is executed in the pertinent one of the data access processing unit 1212 to 1214 when the procedure is called in step 1410 of FIG. 14.

First, in step 1601, data and coordinates thereof are received from the query processing unit 1205 and the process proceeds to step 1602.

In step 1602, the entry of the page index 801 corresponding to the received data is determined and the process proceeds to step 1603. When the block coordinates of the received data are (I(1), I(2), . . . , I(N)), the position k of the entry of the page index is given by the following equation:

$$k = I(1) + I(2) \times G(1) + I(3) \times G(1) \times G(2) + \ldots + I(N) \times G(1) \times G(2) \times \ldots \times G(N-1)$$

where G(p) is the number of groups of members of each dimension.

In step 1603, the page number field 803 of the entry of the page index determined in step 1602 is examined to judge whether the page corresponding to the entry is already assigned or not. When the page is assigned, the process proceeds to step 1606 and when the page is not assigned, the process proceeds to step 1604.

In step 1604, an unused page is obtained from the page area 804 of the hard disk in the unit and the process proceeds to step 1605.

In step 1605, the page number of the page assigned in step 1604 is registered in the page number field 803 of the page index entry examined in step 1603 and the process proceeds to step 1606.

In step 1606, the page format code field 802 of the page index entry determined in step 1602 is examined. When the code stored therein is the code indicative of the compressed allocation format, the process proceeds to step 1607 and when it is the code indicative of the linear allocation format, the process proceeds to step 1612.

In step 1607, it is judged whether there is any blank in the page corresponding to the page number obtained in step 1603 or the last page reached by tracing a chain of an overflown page when the page has the overflown page or not. When there is no blank, the process proceeds to step 1608 and when there is a blank, the process proceeds to step 1610.

In step 1608, an unused page is obtained from the page area 804 of the hard disk in the unit and the process proceeds to step 1609.

In step 1609, the page number of the page assigned in step 1608 is registered in the header information area 901 of the overflown page in the last end of the chain obtained in step 1607 and the process proceeds to step 1610.

In step 1610, the cell ID corresponding to the data received in step 1601 is determined and the process proceeds to step 1611. The definite determination method of the cell ID is the same as in step 115 of FIG. 1.

In step 1611, the cell ID determined in step 1601 and the data received in step 1601 are stored in unused cell ID area 903 and cell record area 904 in the page having blank obtained in step 1603 or the page assigned newly in step 1604 or 1608, respectively, and this procedure is finished. When the cell ID and the variable value are stored, the data in the page or the data in the page including the overflown page may be rearranged in order of sorted values of the cell ID. By sorting the cell ID, data can be retrieved at a higher speed.

In step 1612, the position in the page in which the data received in step 1601 is stored is determined and the data is stored in the cell record area 1003 at the position. Then, this procedure is finished. The definite determination method of the position k in the cell record area is the same as in step 117 of FIG. 1.

Figure 17:
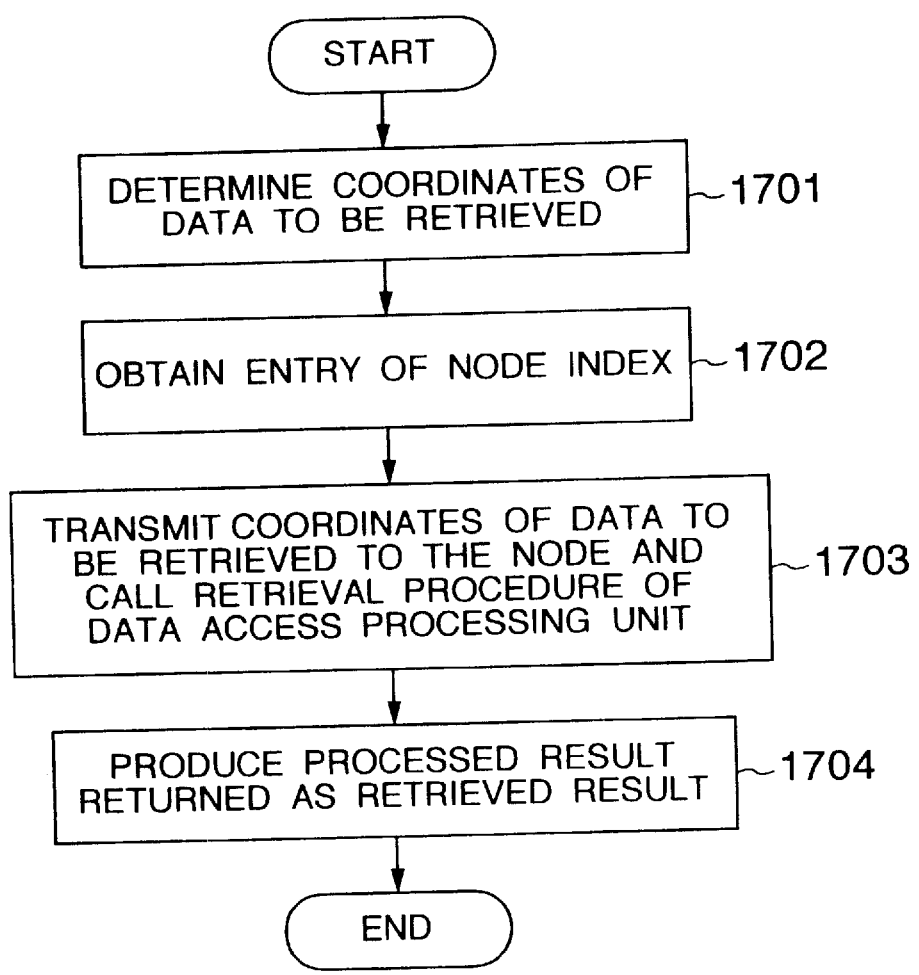
FIG. 17 is a flow chart showing a retrieval procedure of multi-dimensional data in the query processing unit of the second embodiment of the present invention.

FIG. 17 is a flow chart showing the multi-dimensional data retrieval procedure in the query processing unit of the second embodiment of the present invention. This procedure is executed in the query processing unit 1205 when the data retrieval request for the multi-dimensional data mode is inputted by the user from any of the query terminals 1201 to 1203.

First, in step 1701, the dimension table and the dimension member table are searched for the dimension member of each dimension specifying the data required to be retrieved, to obtain pertinent dimension member coordinates, dimension member group coordinates and dimension member relative coordinates and the process proceeds to step 1702.

In step 1702, the entry position k of the node index 1301 corresponding to the data to be retrieved is calculated by the following equation to obtain the node index entry in the position and the process proceeds to step 1703.

$$k = I(1) + I(2) \times G(1) + I(3) \times G(1) \times G(2) + \ldots + I(N) \times G(1) \times G(2) \times \ldots \times G(N-1)$$

where the block coordinates of the data to be retrieved are (I(1), I(2), . . . , I(N)) and G(1), G(2), . . . , G(N) are the numbers of groups of members of each dimension.

In step 1703, the node number is obtained from the node number field 1302 of the entry obtained in step 1702 and the coordinates of the data to be retrieved obtained in step 1701 are transmitted to the data access processing unit having the node number. The multi-dimensional data retrieval procedure (FIG. 18) in the unit is called and after the processed result by the procedure is received, the process proceeds to step 1704.

In step 1704, the processed result returned in step 1703 is produced as a value of the data to be retrieved and this procedure is finished.

Figure 18:
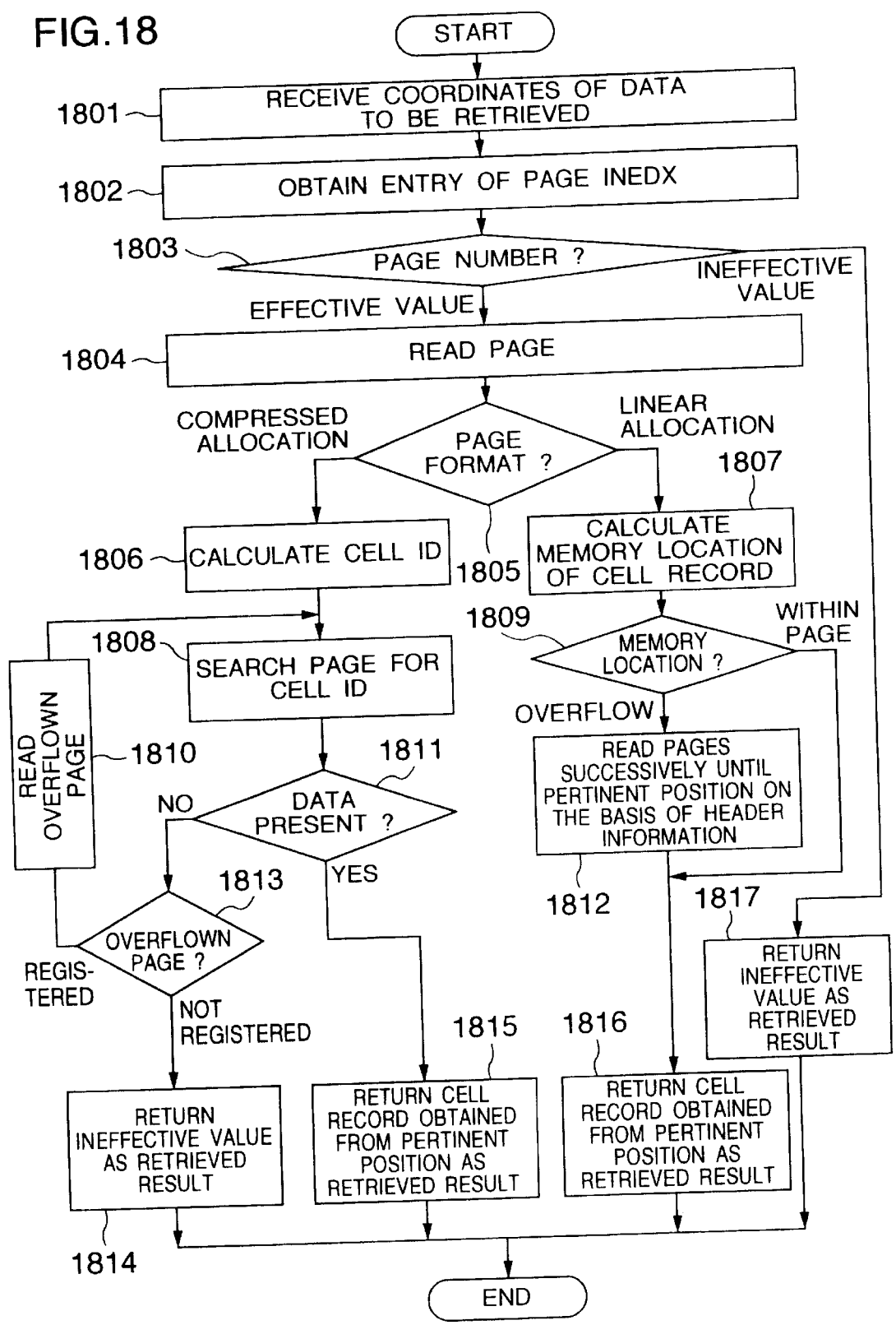
FIG. 18 is a flow chart showing a retrieval procedure of multi-dimensional data in the data access processing unit of the second embodiment of the present invention.

FIG. 18 is a flow chart showing the multi-dimensional data retrieval procedure in the data access processing unit of the second embodiment of the present invention. This procedure is executed in a pertinent one of the data access processing units 1212 to 1214 when this procedure is called in step 1703 of FIG. 17.

First, in step 1801, the coordinate value of the data to be retrieved is received from the query processing unit 1205 and the process proceeds to step 1802.

In step 1802, the entry position k of the page index 801 corresponding to the data to be retrieved is calculated by the following equation to obtain the page index entry in the position and the process proceeds to step 1803.

ti $k=I(1)+I(2)\times G(1)+I(3)\times G(1)\times G(2)+ \ldots +I(N)\times G(1)\times G(2)\times \ldots \times G(N-1)$ where the block coordinates of the data to be retrieved are (I(1), I(2), . . . , I(N)) and G(1), G(2), . . . , G(N) are the numbers of groups of members of each dimension.

In step 1803, the value of the page number registered in the page number field 803 of the entry obtained in step 1802 is judged. When the value is effective, the process proceeds to step 1804 and when the value is ineffective, the process proceeds to step 1817.

In step 1804, the page having the page number obtained in step 1803 is read from the hard disk of the unit into the memory and process proceeds to step 1805.

In step 1805, the page format code field 802 of the entry obtained in step 1802 is examined. When the code stored therein is the code indicative of the compressed allocation format, the process proceeds to step 1806 and when it is the code indicative of the linear allocation format, the process proceeds to step 1807.

In step 1806, the cell ID of the data to be retrieved is calculated and the process proceeds to step 1808. The definite calculation method of the cell IC is the same as the method shown in step 115 of FIG. 1.

In step 1808, the page read into the memory in step 1804 or 1810 is searched for the cell record having the same cell ID as the value calculated in step 1806 and the process proceeds to step 1811.

In step 1811, it is judged whether the pertinent cell record is present within the page or not. When it is not present, the process proceeds to step 1813 and when it is present, the process proceeds to step 1815.

In step 1813, it is judged whether the page number of the overflown page is registered in the header information area 901 of the page searched in step 1808 or not. When there is the overflown page, the process proceeds to step 1810 and when there is no overflown page, the process proceeds to step 1814.

In step 1810, the overflown page having the page number obtained in step 1813 is read from the hard disk into the memory and the process proceeds to step 1808.

In step 1814, an ineffective value is returned to the query processing unit 1205 as the processed result and this procedure is finished.

In step 1815, the contents of the cell record detected in step 1811 is returned to the query processing unit 1205 as the processed result and this procedure is finished.

In step 1807, the memory location of the cell record holding the data to be retrieved is calculated and the process proceeds to step 1809. The definite calculation method of the memory location of the cell record is the same as the method shown in step 117 of FIG. 1.

In step 1809, it is judged whether the memory location calculated in step 1807 is present within the page read into the memory in step 1804 or not. When the position is present, the process proceeds to step 1816 and when it is not present, the process proceeds to step 1812.

In step 1812, the overflown pages registered in the header information area 1001 of the read page are successively traced to read the pages until the pertinent page is reached and the process proceeds to step 1816.

In step 1816, the contents of the cell record in the memory location calculated in step 1807 is returned in the query processing unit 1205 as the processed result and this procedure is finished.

In step 1817, an ineffective value is returned to the query processing unit 1205 as the processed result and this procedure is finished.

We claim:

1. A method of storing multi-dimensional data in a database management system in which data identified by a combination of members of a plurality of dimensions are stored in a memory unit and a query relating to said data is processed, comprising:

a step of grouping a collection of members constituting each dimension to determine a collection of member groups;

a step of assigning to said memory unit a memory area of a page index constituted by entries corresponding to each combination relating to said plurality of dimensions, of said member groups determined in said grouping step;

a step of inputting data to be stored in said memory unit;

a step of determining a set of member groups corresponding to said data inputted in said inputting step, from a set of members of dimensions specifying said data on the basis of said grouping of said grouping step;

a step of obtaining an entry corresponding to said set of member groups determined in said set determining step, from said page index having said memory area assigned in said assigning step;

a step of allotting a memory area of a page to said memory unit when a page number is not registered in said entry of said page index obtained in said obtaining step and registering said page number of said page in said entry of said page index; and a step of pairing said data inputted in said inputting step and identification information of said data to store said paired data and identification information in said page having said page number registered in said page index entry obtained in said obtaining step.

2. A multi-dimensional data storing method according to claim 1, wherein said grouping step comprises assigning a series of numerical coordinates to said members constituting each dimension and dividing said coordinates by sections to thereby group said members and assign a series of numerical coordinates to said member groups; and said assigning step comprises arranging each entry of said page index in order of a nest with respect to a set of numerical coordinates of said member group corresponding to said entry;

said grouping step comprising determining block coordinates which are the set of numerical coordinates of the corresponding member group from said set of members of dimensions specifying said input data;

said obtaining step comprising calculating a distance from the head of said page index on the basis of said block coordinates determined in said set determining step to thereby determine a memory location of said entry and obtain said entry.

3. A multi-dimensional data storing method according to claim 2, wherein said grouping step further comprises determining cell coordinates which are a set of numerical coordinates of members from said set of members of dimensions specifying said input data; and said pairing step further comprises coding said cell coordinates of said input data into numerical value to thereby determine said identification information of said data.

4. A multi-dimensional data storing method according to claim 2, wherein said grouping step further comprises assigning to said members constituting each dimension, relative coordinates obtained by subtracting a minimum value of numerical coordinates of members belonging to the same group as said member from numerical coordinates of said member; and said grouping step further comprises determining relative cell coordinates which are a set of relative coordinates of members from said set of members of dimensions specifying said input data;

said pairing step further comprising coding said relative cell information of said input data into numerical value to thereby determine said identification information of said data.

5. A multi-dimensional data storing method according to claim 2, wherein said grouping step further comprises assigning to said members constituting each dimension, relative coordinates obtained by subtracting a minimum value of numerical coordinates of members belonging to the same group as said member from numerical coordinates of said member; and said grouping step further comprises determining relative cell coordinates which are a set of relative coordinates of members from said set of members of dimensions specifying said input data;

said allotting step comprising allotting a memory area of pages of a first or second kind to said memory unit when said page number is not registered in said page index entry;

said pairing step comprising, when said page having said page number registered in said page index entry is a page of the first kind, pairing said input data and said identification information of said data to store said paired input data and identification information in said page and when said page is a page of the second kind, storing said input data in said page and arranging memory locations of said data in said page in order of a nest with respect to the relative cell coordinates of said data.

6. A multi-dimensional data storing method according to claim 5, wherein said grouping step further comprises determining cell coordinates which are a set of numerical coordinates of members from said set of members of dimensions specifying said input data; and said pairing step further comprises coding said cell coordinates of said input data into numerical value to thereby determine said identification information of said data.

7. A multi-dimensional data storing method according to claim 5, wherein said grouping step further comprises assigning to said members constituting each dimension, relative coordinates obtained by subtracting a minimum value of numerical coordinates of members belonging to the same group as said member from numerical coordinates of said member; and said grouping step further comprises determining relative cell coordinates which are a set of relative coordinates of members from said set of members of dimensions specifying said input data;

said pairing step further comprising coding said relative cell coordinates of said input data into numerical value to thereby determine said identification information of said data.

8. A method of retrieving multi-dimensional data in a database management system in which data identified by a combination of members of a plurality of dimensions are stored in a memory unit and a query relating to said data is processed, comprising:

a step of assigning a series of numerical coordinates to members constituting each dimension and dividing said coordinates by sections to group said members and assign a series of numerical coordinates to member groups obtained by said grouping;

a step of allotting to said memory unit, memory areas for page indexes constituted by entries corresponding to combinations relative to said plurality of dimensions, of said member groups determined in said numerical coordinate assigning step and in which said entries are arranged in order of a nest with respect to a set of numerical coordinates of said corresponding member group;

a step of inputting data to be stored in said memory unit;

a step of determining block coordinates which are a set of numerical coordinates of a member group corresponding to said data inputted in said data inputting step, from a set of members of dimensions specifying said data;

a step of calculating a distance from the head of said page indexes on the basis of said block coordinates determined in said block coordinate determining step to thereby determine a memory location of said page index entry corresponding to said block coordinates and obtain said entry;

a step of assigning a memory area of a page to said memory unit to register a page number of said page in said entry when the page number is not registered in said page index entry obtained in said calculating step;

a step of pairing said data inputted in said data inputting step and identification information of said data to store said paired data and identification information in the page having the page number registered in said page index entry obtained in said calculating step;

a step of inputting a retrieval condition represented by a combination of members of dimensions;

a step of determining block coordinates corresponding to said retrieval condition inputted in said retrieval condition inputting step from combinations of members of dimensions specifying retrieval data;

a step of making calculation of a distance from the head of said page index on the basis of said block coordinates determined in said corresponding block coordinate determining step to thereby determine a memory location of said page index entry corresponding to said block coordinates and obtain said entry; and a step of obtaining from said memory unit the page having the page number registered in said page index entry obtained in said calculation making step and obtaining data having identification information corresponding to the retrieval data from said page.

9. A method of storing multi-dimensional data in a database management system including a plurality of processing nodes each having a CPU and a memory unit and interconnected through a communication network and in which data identified by a combination of members of a plurality of dimensions are stored in said memory units of said plurality of processing nodes and a query relating to said data is processed, comprising:

a step of assigning a series of numerical coordinates to members constituting each dimension and dividing said coordinates by sections to thereby group said members and assign a series of numerical coordinates to the obtained member groups;

a step of allotting to said memory units of said plurality of processing nodes, memory areas for page indexes constituted by entries corresponding to combinations relative to said plurality of dimensions, of said member groups determined in said numerical coordinate assigning step and in which said entries are arranged in order of a nest with respect to a set of numerical coordinates of said corresponding member group;

a step of inputting data to be stored in said memory units of said plurality of processing nodes;

a step of determining block coordinates which are a set of numerical coordinates of a member group corresponding to said data inputted in said data inputting step, from combinations of members of dimensions specifying said data;

a step of determining a processing node for storing said data inputted by said data inputting step on the basis of said block coordinates determined by said block coordinate determining step so that data positioned in adjacent different diagonal planes of block coordinate space are assigned to different processing nodes;

a step of, in regard to said processing unit determined in said processing node determining step, calculating a distance from the head of said page indexes of said processing node determined in said processing node determining step on the basis of said block coordinates determined in said block coordinate determining step to thereby determine a memory location of a page index entry corresponding to said block coordinates and obtain said entry;

a step of, in regard to said processing unit determined in said processing node determining step, assigning a memory area of a page to said memory unit of said processing node determined in said processing node determining step and registering a page number of said page in said page index entry obtained in said calculating step when the page number is not registered in said page index entry; and a step of, in regard to said processing unit determined in said processing unit determining step, pairing said data inputted in said data inputting step and identification information of said data to store said paired data and identification information in said page having said page number registered in said page index entry obtained in said calculating step.

10. A method of retrieving multi-dimensional data in a database management system including a plurality of processing nodes each having a CPU and a memory unit and interconnected through a communication network and in which data identified by a combination of members of a plurality of dimensions are stored in said memory units of said plurality of processing nodes and a query relating to said data is processed, comprising:

a step of assigning a series of numerical coordinates to members constituting each dimension and dividing said coordinates by sections to thereby group said members and assign a series of numerical coordinates to the obtained member groups;

a step of allotting to said memory units of said plurality of processing nodes, memory areas for page indexes constituted by entries corresponding to combinations relative to said plurality of dimensions, of said member groups determined in said numerical coordinate assigning step and in which said entries are arranged in order of a nest with respect to a set of numerical coordinates of said corresponding member group;

a step of inputting data to be stored in said memory units of said plurality of processing nodes;

a step of determining block coordinates which are a set of numerical coordinates of a member group corresponding to said data inputted in said data inputting step, from combinations of members of dimensions specifying said data;

a step of determining a processing node for storing said data inputted by said data inputting step on the basis of said block coordinates determined by said block coordinate determining step so that data positioned in adjacent different diagonal planes of block coordinate space are assigned to different processing nodes;

a step of, in regard to said processing unit determined in said processing node determining step, calculating a distance from the head of said page indexes of said processing node determined in said processing node determining step on the basis of said block coordinates determined in said block coordinate determining step to thereby determine a memory location of a page index entry corresponding to said block coordinates and obtain said entry;

a step of, in regard to said processing unit determined in said processing node determining step, assigning a memory area of a page to said memory unit of said processing node determined in said processing node determining step and registering a page number of said page in said page index entry obtained in said calculating step when the page number is not registered in said page index entry; and a step of, in regard to said processing unit determined in said processing unit determining step, pairing said data inputted in said data inputting step and identification information of said data to store said paired data and identification information in said page having said page number registered in said page index entry obtained in said calculating step;

a step of inputting a retrieval condition represented by a combination of members of dimensions;

a step of deciding block coordinates corresponding to said retrieval condition inputted in said retrieval condition inputting step from combinations of members of dimensions specifying retrieval data;

a step of determining a processing node for storing said retrieval data having said block coordinates determined in said block coordinate deciding step in accordance with an assignment method to said processing node of the memory data determined in said processing node determining step;

a step of, in regard to said processing node determined in said processing node determining step, making calculation of a distance from the head of said page index on the basis of said block coordinates determined in said block coordinate determining step to thereby determine a memory location of said page index entry corresponding to said block coordinates and obtain said entry; and a step of, in regard to said processing node determined by said processing node determining step, obtaining from said memory unit of said processing unit the page having the page number registered in said page index entry obtained in said calculation making step and obtaining data having identification information corresponding to the retrieval data from said page.

\* \* \* \* \*